United States Patent [19]
Iwata et al.

[11] Patent Number: 5,579,129
[45] Date of Patent: Nov. 26, 1996

[54] ORIGINAL READING APPARATUS AND INFORMATION PROCESSING APPARATUS WITH ORIGINAL READING APPARATUS

[75] Inventors: Naohiro Iwata, Yokosuka; Minoru Yokoyama, Yokohama; Yuji Nakano, Kawasaki; Hideyuki Terashima, Sagamihara, all of Japan

[73] Assignee: Canon Kabushiki Kaisha, Tokyo, Japan

[21] Appl. No.: 351,946

[22] Filed: Dec. 8, 1994

[30] Foreign Application Priority Data

Dec. 17, 1993 [JP] Japan ..................... 5-317771
Apr. 18, 1994 [JP] Japan ..................... 6-078632

[51] Int. Cl.⁶ .................................................. H04N 1/413
[52] U.S. Cl. ................. 358/474; 358/488; 358/498
[58] Field of Search ......................... 358/488, 504–505, 358/516, 474, 498; 355/308, 317

[56] References Cited

U.S. PATENT DOCUMENTS

| | | | |
|---|---|---|---|
| 4,959,536 | 9/1990 | Ijuin et al. | 250/216 |
| 4,975,787 | 12/1990 | Ijuin et al. | 358/461 |
| 5,101,284 | 3/1992 | Tanabe | 358/498 |
| 5,125,047 | 6/1992 | Ito et al. | 358/498 |
| 5,130,807 | 7/1992 | Tanabe et al. | 358/296 |
| 5,191,438 | 3/1993 | Katsurada et al. | 358/488 |
| 5,267,058 | 11/1993 | Sata | 358/498 |
| 5,453,852 | 9/1995 | Morikawa et al. | 358/498 |

*Primary Examiner*—Stephen Brinich
*Attorney, Agent, or Firm*—Fitzpatrick, Cella, Harper & Scinto

[57] ABSTRACT

The present invention provides an original reading apparatus including a pre-scan mode for reading a color reference member before an original is read, a registration mode for aligning a tip end of the original before the original is read, and a reading mode for conveying and reading the original. The reading apparatus further comprises first and second rotary member to perform the above three modes, and these modes are effected by selectively rotating the first and second rotary members in a normal direction and/or reverse direction and selectively stopping the first or second rotary member.

17 Claims, 18 Drawing Sheets

REVERSE ROTATION OF MOTOR

CS ROLLER STOPPED

SEPARATION ROLLER STOPPED

REVERSE ROTATION OF MOTOR

REVERSE ROTATION
(CS MOVES RIGHT)

STOP

REVERSE ROTATION OF MOTOR

STOP        STOP

REVERSE ROTATION OF MOTOR

STOP        STOP

NORMAL ROTATION OF MOTOR

NORMAL ROTATION OF MOTOR

NORMAL ROTATION OF MOTOR

ORIGINAL READING APPARATUS AND INFORMATION PROCESSING APPARATUS WITH ORIGINAL READING APPARATUS

BACKGROUND OF THE INVENTION

1. Field of the Invention

The present invention relates to an original reading apparatus and an information processing apparatus having such an original reading apparatus, and more particularly it relates to an information processing apparatus such as a facsimile, an image reader, a digital copying machine, an electronic black board and the like having a reading apparatus as an input portion for reading information on an original to be read while relatively shifting the original in a condition that the original is closely contacted (including light contact) with an original reading surface.

2. Related Background Art

Recently, in order to make information processing apparatuses such as facsimiles, image readers and the like compact and to improve the performance of such information processing apparatuses, there has been proposed an elongated line-sensor which can be used with an equi-magnification optical system as a photoelectric conversion device for a reading apparatus or which can be used without any specific optical system. Particularly, reading apparatuses wherein reflection light including information from an original can be directly detected by a photoelectric conversion device through a transparent spacer such as glass without using an equi-magnification fiber lens array, thereby making the apparatus compact and inexpensive have been put to practical use.

Incidentally, hereinafter, an optical conversion apparatus of the type wherein information is read without any optical system is referred to as "image sensor of complete contact type". FIG. 24 is a schematic sectional view of a reading apparatus of a conventional facsimile system in which an image sensor of complete contact type is used as an image information reading apparatus and which includes an original separation roller and a contact sensor roller (CS roller) as a convey means.

A flow of an original in FIG. 24 is as follows. When an original bundle 103 is inserted from an original insertion opening 101 into an original insertion path 102, a signal from an original presence/absence detection sensor (not shown) is sent to a control portion so that an original presence condition is ascertained by the apparatus. Further, the original bundle 103 is inserted to reach an original separation portion 106 which includes an original separation roller 104, and an original separation piece 105 opposed to the original separation roller 104 with the interposition of an original convey path and biased toward the original separation roller 104 by a biasing means (not shown).

Then, when a start key (not shown) arranged on an operation portion is depressed, a reading drive system (not shown) is operated so that the original separation roller 104 is rotated to convey the original bundle 103. The original bundle 103 is pinched between the rotating original separation roller 104 and the original separation piece 105 urged against the separation roller 104 by the biasing force, thereby separating the original one by one. The separated original 107 is conveyed by the rotating original separation roller 104, with the result that a tip end of the original is detected by an original tip end sensor (not shown). The original 107 is further conveyed by the rotating original separation roller 104 to reach an image information reading portion 110 which includes an image sensor 108 of complete contact type, and a CS roller 109 opposed to the image sensor 108 with the interposition of the original convey path. The image sensor 108 of complete contact type is urged against the CS roller 109 by a biasing means 111. Image information on the original 107 sent to the image information reading portion 110 is read by the image sensor 108 of complete contact type while the original is being conveyed by the rotating CS roller 109.

By the way, during the reading of the image information, if an original convey speed is not constant, the image information cannot be read properly. However, since the original convey speed of the original separation roller 104 is not constant (uneven), the original convey speed is determined by the CS roller 109. That is to say, the original convey speed of the CS roller 109 is set to be greater than that of the original separation roller 104, and an original convey force of the CS roller 109 is set to be sufficiently greater than a friction force between the original 107 and the original separation piece 105.

In this way, the original 107 is conveyed by the CS roller 109 while reading the image information by means of the image sensor 108 of a complete contact type. When a trailing end of the original is detected by an original trail end detection sensor (not shown), the original is discharged out of the apparatus through an original discharge opening 112.

As mentioned above, since the original convey speed of the original separation roller 104 is not constant (uneven), even when the tip end of the original is detected by the original tip end detection sensor after the original has been separated, the time period for conveying the original from the original tip end detection sensor to the image information reading portion does not become constant, thereby causing a problem that an excessive or poor margin is created at a tip end portion of the original.

Further, as shown in FIG. 25, if the original is skew-inserted, either the left or right side (left side in FIG. 25) of the tip end of the original 107 will firstly be abutted against the CS roller 109. In this case, since the left side of the original 107 is conveyed by the CS roller 109, the left side of the original is subjected to the original convey force. On the other hand, since the original convey speed of the original separation roller 104 is smaller than that of the CS roller 109, a central portion of the original is subjected to a friction force (between the original 107 and the original separation piece 105) directing toward a direction opposite to the original convey direction. As a result, as shown in FIG. 25, a moment is generated in the original 107 to rotate the original in an anti-clockwise direction, thereby enhancing the skew-feed of the original.

SUMMARY OF THE INVENTION

The present invention intends to eliminate the above-mentioned conventional drawbacks, and has an object to provide an original reading apparatus and an information processing apparatus having such an original reading apparatus, which have a simple construction and can read an original effectively.

Another object of the present invention is to align an original easily and correctly for reading the original.

The other object of the present invention is to perform pre-scan regarding an original easily and correctly for reading the original.

To achieve the above objects, according to the present invention, there is provided an original reading apparatus including a pre-scan mode for reading a color reference member before an original is read, a regist mode for aligning a tip end of the original before the original is read, and a reading mode for conveying and reading the original. More particularly, there is provided an original reading apparatus comprising a first rotary member for conveying the original, and a second rotary member opposed to an image information reading portion positioned at a downstream side of the first rotary member and adapted to convey the original. Wherein the pre-scan mode is performed by rotating the second rotary member reversely, the regist mode is performed by stopping the second rotary member and by rotating the first rotary member normally, and the reading mode is performed by rotating the second rotary member normally.

According to the present invention, since the pre-scan mode and the regist mode are performed before the original is read, the original can be read well.

Further, according to the present invention, since the pre-scan mode, the regist mode and the reading mode are performed by rotating a single motor normally or reversely, the apparatus can be made compact.

In addition, according to the present invention, since the rotary member can be reversely rotated to convey the original at the reading portion, the pre-scan can easily be effected.

Since the original reading apparatus according to the present invention has the above-mentioned construction, the reading of the original can be performed effectively with a simple construction.

Further, regarding combination of the rotational directions of the original separation roller and the CS roller, the following three modes are set:

(1) original separation roller: stop CS roller: reverse rotation;

(2) original separation roller: normal rotation CS roller: normal rotation;

(3) original separation roller: normal rotation CS roller: stop.

Further, by providing a mechanical timer mechanism, and a clutch mechanism for determining the permission or prevention of mechanical transmission of power by switching a rotational direction of a stepping motor, the above three modes can be performed by normal and reverse rotations of the single stepping motor, thereby obtaining a compact reading apparatus wherein, pre-scan, registration and normal original conveyance can be performed.

Further, since the pre-scan can be performed at a position remote from the convey means by shifting the reading portion toward the white reference member, the pre-scan is not influenced by the contamination of the convey means and the like.

In addition, since the reading portion is shifted by the convey rotary member, the structure for shifting the reading portion can be simplified.

DETAILED DESCRIPTION OF THE PREFERRED EMBODIMENTS

Figure 1:
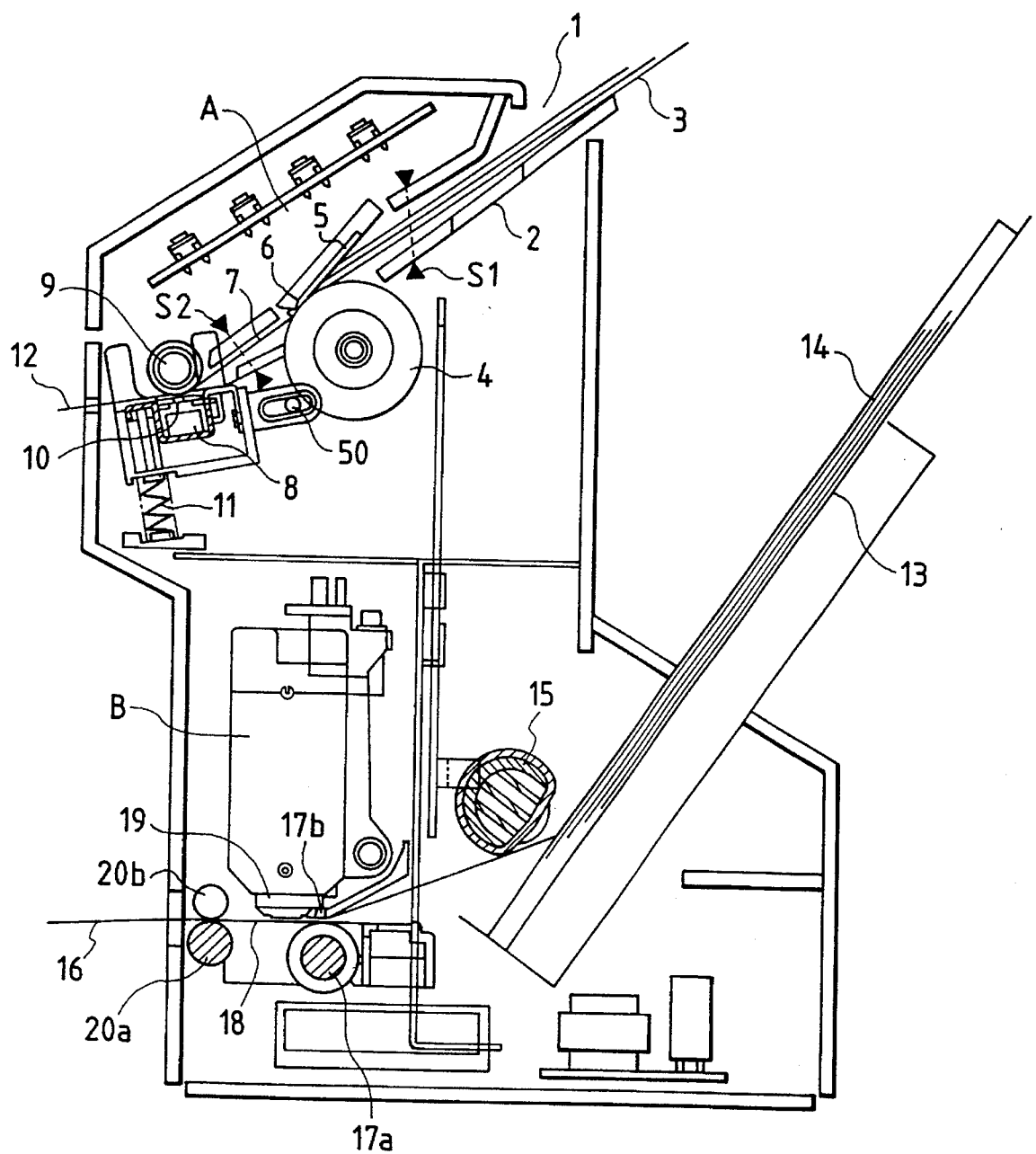
FIG. 1 is a schematic sectional view of a facsimile system incorporating a reading apparatus according to a preferred embodiment of the present invention.

The present invention will now be explained with reference to the accompanying drawings, FIG. 1 is a schematic sectional view of a facsimile system incorporating a reading apparatus according to a preferred embodiment of the present invention. The facsimile system comprises an upper reading system A and a lower recording system B, A flow of an original in the reading system A is as follows. When an original bundle 3 is inserted from an original insertion opening 1 into an original insertion path 2 inclined with respect to a horizontal plane by 30° to 40°, a signal from an original presence/absence detection sensor $S_1$ is sent to a control portion so that an original presence condition is ascertained by the facsimile system. Further, the original bundle 3 is inserted to reach an original separation portion 6 which includes an original separation roller 4, and an original separation piece 5 opposed to the original separation roller 4 with the interposition of an original convey path and biased toward the original separation roller 4 by a biasing means (not shown).

Then, when a start key (not shown) arranged on an operation portion is depressed, a reading drive system (not shown) is operated so that the original separation roller 4 is rotated to convey the original bundle 3. The original bundle 3 is pinched between the rotating original separation roller 4 and the original separation piece 5 urged against the separation roller 4 by the biasing force, thereby separating the original one by one. The separated original 7 is conveyed by the rotating original separation roller 4, with the result that a tip end of the original is detected by an original tip end sensor $S_2$. The original 7 is further conveyed by the rotating original separation roller 4 to reach an image information reading portion 10 which includes an image sensor 8 of complete contact type, and a CS roller 9 opposed to the image sensor 8 with the interposition of the original convey path. The image sensor 8 of complete contact type is urged against the CS roller 9 by a biasing means 11 image information on the original 7 sent to the image information reading portion 10 is read by the image sensor 8 of complete contact type while the original is being conveyed by the rotating CS roller 9. When a trailing end of the original 7 is detected by an original trail end detection sensor (not shown), the original is discharged out of the system through an original discharge opening 12 by means of the CS roller 9.

A flow of a recording sheet in the recording system B is as follows.

A recording sheet is separated one by one from a recording sheet bundle 14 rested on a recording sheet stacking tray 13 by means of a separation roller 15. The recording sheet 16 separated by the separation roller 15 is sent to a pair of recording sheet convey rollers 17a, 17b opposed to each other with the interposition of a recording sheet convey path, and then is sent to an image recording position 18 by the pair of recording sheet convey rollers 17a, 17b. The recording sheet 16 is temporarily stopped and maintained at the image recording position 18.

In the image recording position 18, ink is discharged from discharge openings of an ink jet recording head 19 arranged to face a recording surface of the recording sheet 16, with the result that ink droplets are adhered to the recording surface of the recording sheet 16, thereby forming an image on the recording sheet. When one-line recording is completed, the recording sheet 16 is conveyed again by rotating the pair of recording sheet convey rollers 17a, 17b. When the recording sheet 16 is conveyed by a predetermined distance, it is stopped again, and the next line recording is performed. When one-page recording is finished by repeating the line-recording operations, the recording sheet 16 is discharged out of the recording system by means of a pair of recording sheet discharge rollers 20a, 20b opposed to each other with the interposition of the recording sheet convey path and is rested on a discharge tray arranged near a discharge opening with an image surface facing upwardly.

Incidentally, the ink jet recording head 19 is preferably of so-called bubble jet type wherein ink is discharged by utilizing thermal energy because the entire system can be made compact and highly fine recording and high speed recording can be easily performed. Further, the information processing apparatus has a reading system or a recording system, and more particularly, a control circuit for controlling at least one of a reading apparatus, an original convey means and a recording means for recording information from the reading apparatus or an external device.

Reading White Reference

Figure 2:
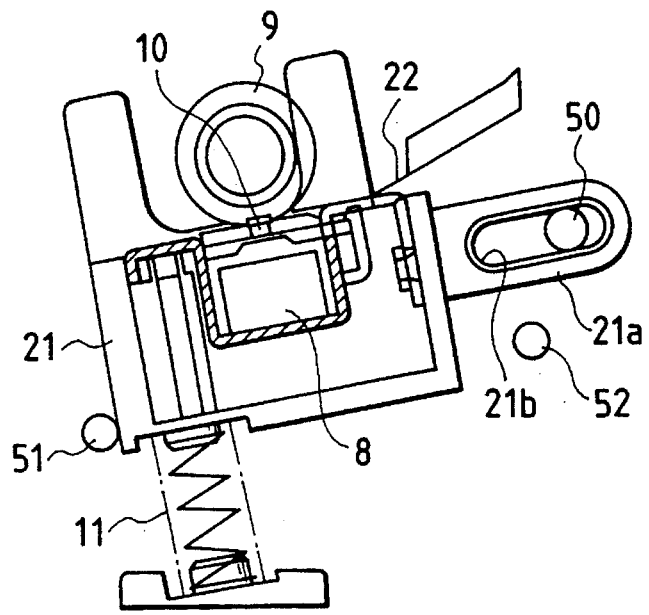
FIG. 2 is an enlarged view of a reading portion of the reading apparatus of FIG. 1.

FIG. 2 is an enlarged view of a reading portion of the reading apparatus according to the embodiment of the present invention. The image sensor 8 of complete contact type is designed so that light from a light source such as an LED is directed to the original 7 and the light reflected from the original is incident to a photoelectric conversion element, where image information of the original is converted into an electric signal which is in turn sent to a control portion (CPU).

Now, in the image sensor 8 of complete contact type, since there is no beam condensing unit such as a lens for directing the light reflected from the original to the photoelectric conversion element, the depth field of the image sensor is 50 to 80 μm at the most. Thus, if the original 7 is floating from a glass reading surface of the image sensor 8 of complete contact type at the image information reading portion 10, good image information cannot be transmitted. To avoid this, the CS roller 9 is arranged in an opposed relation to the image information portion 10 of the image sensor 8 of the complete contact type with the interposition of the original convey path and the biasing means 11 is attached to a sensor holder 21 for holding the image sensor 8 so that the image sensor 8 is urged against the CS roller 9, thereby conveying the original 7 by the CS roller 9 and closely contacting the original 7 with the image information reading portion 10 of the image sensor 8 of complete contact type.

Further, although the original 7 is conveyed by the CS roller 9, since the reading glass surface of the image sensor 8 of complete contact type is stationary when the original is being conveyed, the original 7 is frictionally slid on the reading glass surface of the image sensor 8 of complete contact type. In order to surely convey various kinds of originals, a coefficient of friction between the image information surface of the original and the reading glass surface of the image sensor of complete contact type must be greater than a coefficient of friction between the back surface of the original and the CS roller. For this reason, the CS roller 9 is made of rubber.

Since the original 7 is conveyed by the CS roller 9 while being closely contacted with the image sensor 8 of complete contact type, any smudge on the back surface of the original (for example, smudge caused due to frictional contact between the original and the original separation piece 5 or characters written by a pencil on the back surface of the original) is transferred onto the CS roller 9. By the way, in the image sensor 8 of complete contact type, output of the sensor for outputting the read information is varied with the time-elapse change of the photoelectric conversion element and the dispersion in the time-elapse changes. Thus, before the reading of image regarding a set of original bundle is started, the whole white image information is read, and the output wave shape from the photoelectric conversion element is corrected on the basis of the result (the reading of the corrected wave shape is referred to as "pre-scan" hereinafter). However, since the CS roller 9 opposed to the image information reading portion 10 of the image sensor 8 of complete contact type has been smudged by the back surface of the original as mentioned above, even when the surface of the CS roller is read, the good pre-scan cannot be achieved.

In the illustrated embodiment, a white reference member 22 for the pre-scan is arranged at an upstream side of the CS roller 9 in an original conveying direction. In a waiting condition, as shown in FIG. 2, the image information reading portion 10 of the image sensor 8 of complete contact type is positioned at an area where the CS roller 9 is contacted with the image sensor 8 of complete contact type. During the pre-scan, the CS roller 9 is rotated in a direction opposite to the original conveying direction by a reading drive system which will be described later. Since the pre-scan is effected prior to the image information reading operation, during the pre-scan, there is no original in the image information reading portion 10. Accordingly, when the CS roller 9 is rotated, the image sensor 8 of complete contact type is shifted to the direction opposite to the original conveying direction. This shifting movement is effected while a slot 21b of an arm 21a is being guided along a pin 50 (which is fixedly mounted on a side wall of the apparatus). The image sensor 8 of complete contact type is shifted until the image information reading portion 10 surely reaches the white reference member 22 (i.e. until the image sensor is positioned by abutting against a stopper 52). In this condition, the pre-scan is effected by reading the white reference member 22 by the contact sensor.

Figure 3:
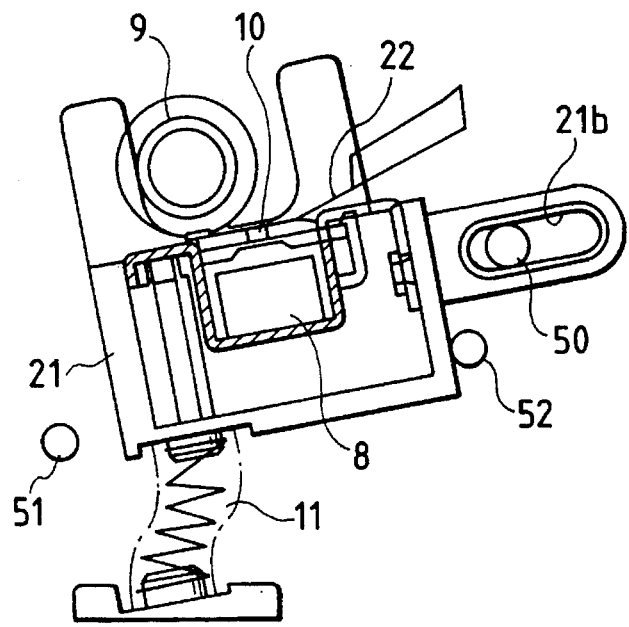
FIG. 3 is an enlarged view of the reading portion of the reading apparatus in a pre-scan condition.

FIG. 3 is an enlarged view of the reading portion in the pre-scan mode. The white reference member 22 is formed from a flexible member so that, when the white reference member is flexed, it is closely contacted with the image information reading portion 10 of the image sensor 8 of complete contact type due to its elasticity. Further, as shown in FIG. 3, when the pre-scan is effected, a lower surface (under surface) of the white reference member 22 is read; whereas, the original is conveyed along an upper surface of the white reference member 22. Thus, if the smudge on the original is transferred to the white reference member 22, since the smudge is transferred to the upper surface of the white reference member, the pre-scan is not adversely influenced by the smudge of the white reference member. After the pre-scan is completed, the CS roller 9 is rotated in the original conveying direction by the reading drive system. When the CS roller 9 is rotated in this way, the image sensor 8 of complete contact type is shifted in the original conveying direction. The image sensor 8 of complete contact type is shifted until the image information reading portion 10 is surely contacted with the CS roller 9 (i.e. until the image sensor is positioned by abutting against a stopper 51), with the result that a series of the pre-scan operations are completed. Incidentally, although it is preferable that the color of the white reference member 22 facing the image sensor be white, if the pre-scan is not interfered with the reference member, the color of the reference member is not limited to white. For example, substantially non-color (achromaticity) such as light grey may be used on the reference member.

Reading Operation

In the present invention, the original is conveyed by two rollers, i.e. original separation roller and CS roller. The original convey speed of the original separation roller is uneven. Thus, even when the tip end of the original is detected by the original tip end detection sensor S₂ after the original is separated, since the time period for conveying the original from the original tip end detection sensor to the image information reading portion does not become constant, an excessive or poor margin is created at a tip end portion of the original. In the present invention, the heading of the original is effected by abutting the tip end of the original against the CS roller, thereby preventing the excessive or poor margin. Further, at the same time, by abutting the tip end of the original against the CS roller, the skew-insertion of the original which was obliquely inserted is corrected, and the subsequent skew-feed of the original is prevented. When the tip end of the original is abutted against the CS roller, the latter is stopped. In order to perform the above-mentioned operation as well as the pre-scan operation, there are at least three mode regarding the rotation of the original separation roller and the CS roller. That is to say:

(1) original separation roller: stop CS roller: reverse rotation;

(2) original separation roller: normal rotation CS roller: normal rotation;

(3) original separation roller: normal rotation CS roller: stop.

(Where, "normal rotation" is rotation toward the original conveying direction, and "reverse rotation" is rotation toward a direction opposite to the original conveying direction.)

In the present invention, the above three modes are controlled by using a single stepping motor.

Figure 4:
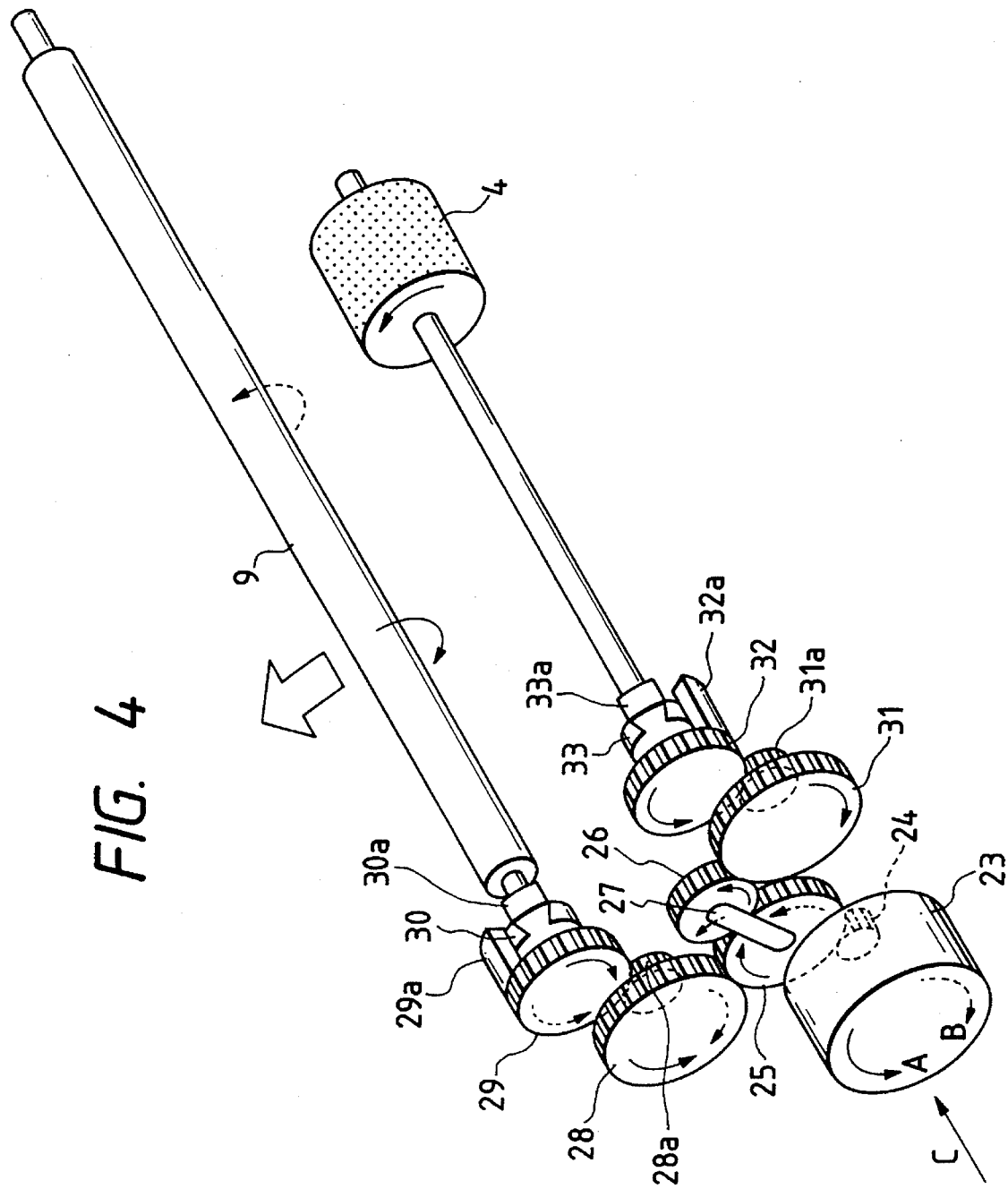
FIG. 4 is a schematic perspective view of a reading drive mechanism of the reading apparatus.

In FIG. 4 which is a schematic view of the reading drive mechanism of the reading apparatus according to the preferred embodiment of the present invention, the reference numeral 4 denotes the original separation roller; 9 denotes the CS roller; 23 denotes a reversible stepping motor as a drive source; and 24 denotes an output gear of the stepping motor 23. A sun gear 25 is rotatably mounted on a stud (not shown) and is always meshed with the output gear 24 of the stepping motor. A planetary gear 26 is rotatably mounted on a stud (not shown) and is always meshed with the sun gear 25. The planetary gear 26 is connected to the sun gear 25 via a bracket 27 so that, when the sun gear 25 is rotated, the planetary gear 26 and the bracket 27 are rotated around the sun gear 25.

A speed-change gear 28 for the CS roller is rotatably mounted on a stud (not shown) and is always meshed with the sun gear 25. An output gear 29 for the CS roller is rotatably mounted on a shaft of the CS roller and is always meshed with a small diameter gear 28a of the speed-change gear 28. An output member 30 for the CS roller is integrally formed with the CS roller 9. The CS roller output gear 29 is provided with a projection 29a protruded toward an axial direction of the CS roller, and the CS roller output member 30 is provided with a projection 30a protruded toward a circumferential direction of the CS roller.

When the CS roller output gear 29 is rotated, there are two cases; i.e. a case where the projection 29a of the CS roller output gear 29 is separated from the projection 30a of the CS roller output member 30 and a case where the projection 29a of the CS roller output gear 29 is contacted with the projection 30a of the CS roller output member 30. When the projection 29a of the CS roller output gear 29 is separated from the projection 30a of the CS roller output member 30, a driving force of the CS roller output gear 29 is not transmitted to the CS roller output member 30; whereas, when the projection 29a of the CS roller output gear 29 is contacted with the projection 30a of the CS roller output member 30, the driving force of the CS roller output gear 29 is transmitted to the CS roller output member 30, thereby rotating the CS roller 9. That is to say, when the CS roller output gear 29 is rotated in a certain direction, while the projection 29a of the CS roller output gear 29 is being separated from the projection 30a of the CS roller output member 30, the CS roller does not rotate. However, when the projection 29a of the CS roller output gear 29 is abutted against the projection 30a of the CS roller output member 30, the CS roller 9 starts to be rotated. Such a structure is referred to as "mechanical timer mechanism" hereinafter.

A speed-change gear 31 for the original separation roller is rotatably mounted on a stud (not shown) so that, when the planetary gear 26 is rolled around the sun gear 25 to be abutted against the speed-change gear 31, the planetary gear 26 is engaged by the speed-change gear 31. When the sun gear 25 is rotated in a certain direction, the planetary gear 26 is rolled around the sun gear 25 while rotating in a direction opposite to the rotational direction of the sun gear 25. When the planetary gear 26 is abutted against the original separation roller speed-change gear 31, the rolling movement (revolution) of the planetary gear 26 around the sun gear 25 is stopped, with the result that the driving force (rotational force) of the planetary gear 26 is transmitted to the speed-change gear 31 because of the engagement between the planetary gear 26 and the speed-change gear 31. An output gear 32 for the original separation roller is rotatably mounted on a shaft of the original separation roller 4 and is always meshed with the original separation roller speed-change gear 31. An output member 33 for the original separation roller is integrally formed with the original separation roller 4, so that a mechanical timer mechanism similar to the above-mentioned one is provided between the output gear 32 and the output member 33.

In FIG. 4, when the gear 24 of the stepping motor 23 is rotated in an anti-clockwise direction A (looked at from a direction shown by the arrow C), the CS roller output gear 29 is rotated in a clockwise direction. Further, the planetary gear 26 is rolled around the sun gear 25 in a clockwise direction to be abutted against and engaged by the original separation roller speed-change gear 31, thereby transmitting the driving force. The speed-change gear 31 is rotated in a clockwise direction and the output gear 32 is rotated in an anti-clockwise direction. As a result, the original separation roller 4 is rotated in the original conveying direction. The above-mentioned rotational direction of the reading drive mechanism is referred to as "normal direction" hereinafter. Further, the movements (rotations) of various gears and rollers when the stepping motor gear 24 is rotated in a clockwise direction B are referred to as "reverse rotation" hereinafter.

When the stepping motor is rotated in the reverse direction, the planetary gear 26 is separated from the original separation roller speed-change gear 31 and is rolled around the sun gear 25 in the anti-clockwise direction until a stopper member of the planetary gear is abutted against the bracket. At this point, the revolution of the planetary gear 26 is stopped, thereby establishing a neutral condition that the driving force is not transmitted. Consequently, the original separation roller 4 is not rotated. On the other hand, the CS roller output gear 29 is rotated in an anti-clockwise direction, thereby rotating the CS roller 9 in the reverse direction.

Figure 5:
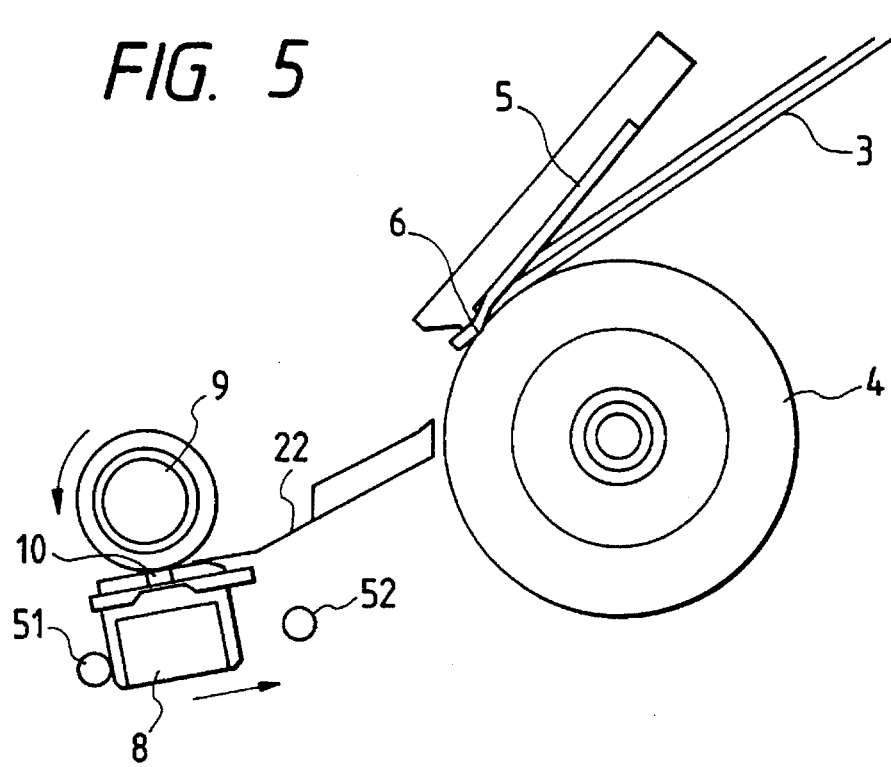
FIGS. 5 to 11 are schematic sectional views for explaining movement of the reading mechanism in a series of reading operations of the reading apparatus.
Figure 6:
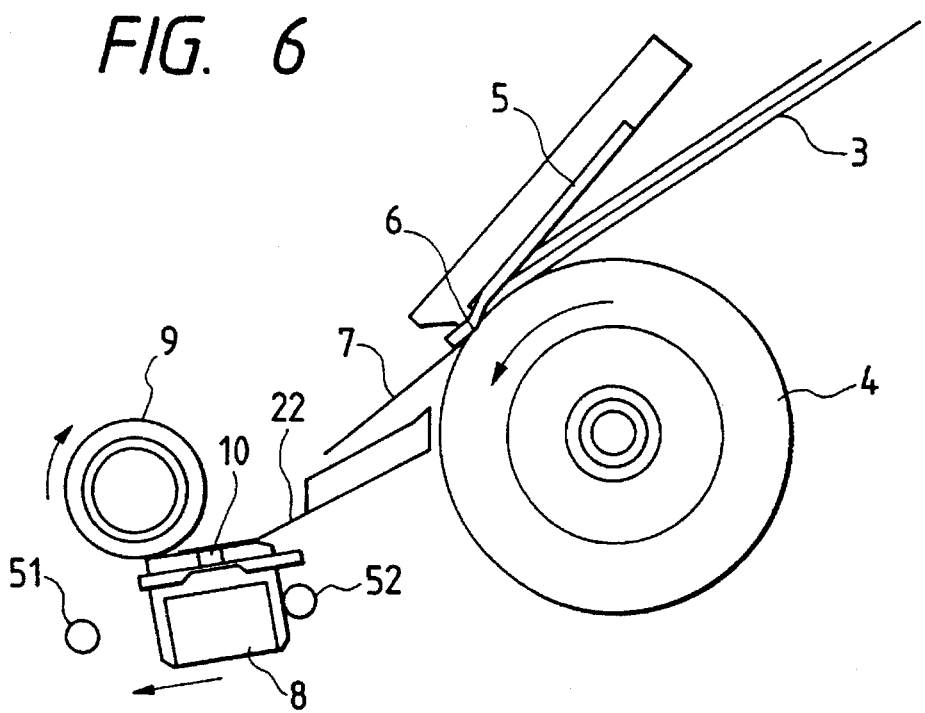
Figure 12A:
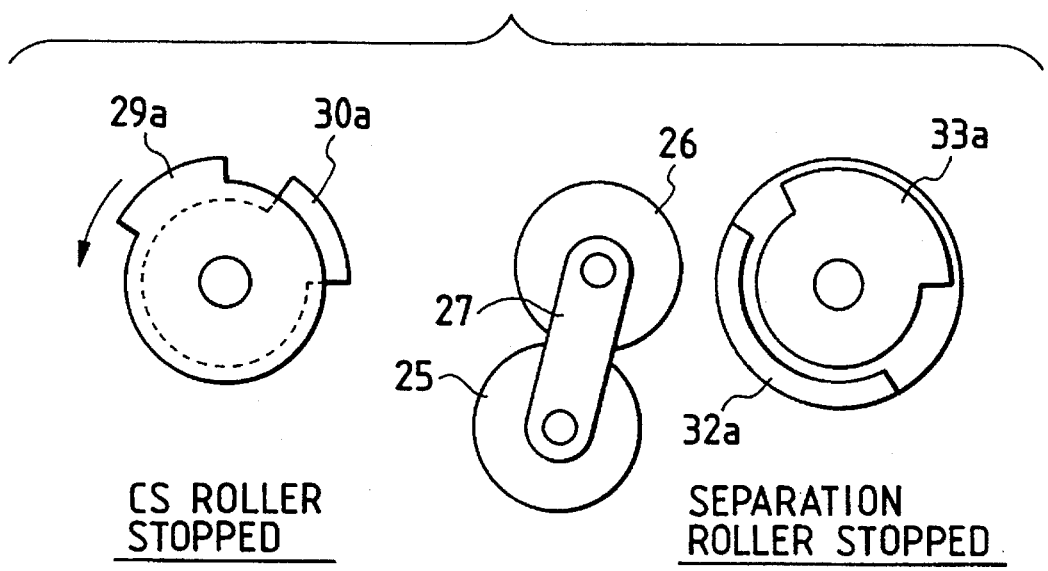
FIGS. 12A and 12B are schematic views of the drive mechanism in a condition of FIG. 5.
Figure 12B:
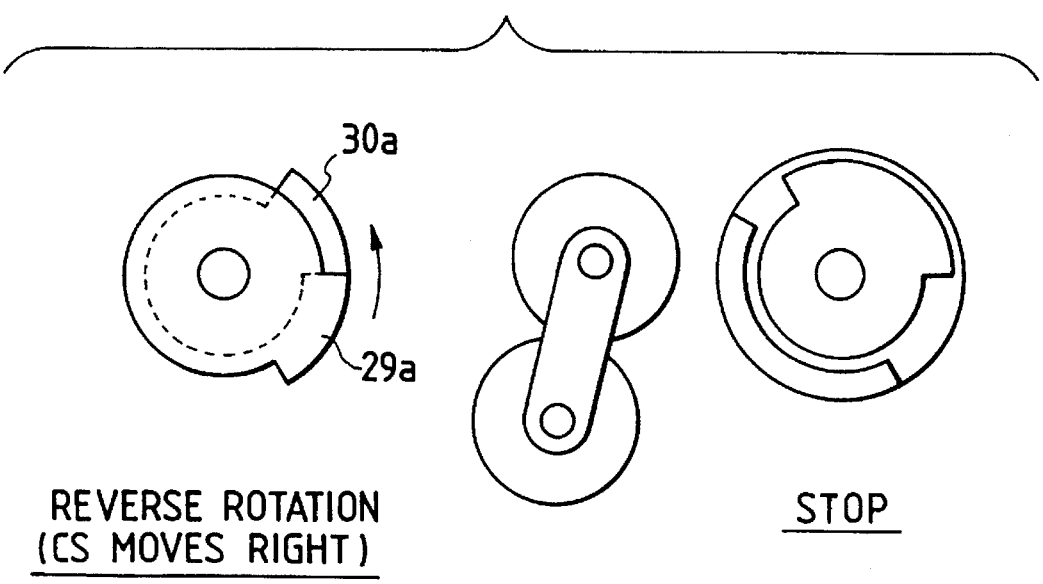

Next, a series of reading operations shown in FIGS. 5 to 11 will be explained. In FIG. 5, the original bundle 3 is inserted to reach the original separation portion 6. Then, when the start key on the operation portion is depressed, the stepping motor is rotated in the reverse direction (clockwise direction B). Thus, the driving force is not transmitted to the original separation roller 4, and thus, the original separation roller is not rotated (FIG. 12A). Since the mechanical timer mechanism is operated, the CS roller 9 is not rotated for a while (FIG. 12A). However, when the projection 29a of the CS roller output gear 29 is abutted against the projection 30a of the CS roller output member 30, the CS roller 9 is rotated in the reverse direction (FIG. 12B). By the reverse rotation of the CS roller 9, the image sensor 8 of complete contact type is shifted to the right in FIG. 5. When the reverse rotation of the stepping motor is stopped, as shown in FIG. 6, the image sensor 8 of complete contact type is positioned below the white reference member 22 disposed at the upstream side of the CS roller 9 in the original conveying direction. The white reference member 22 is urged against the image information reading portion 10 of the image sensor 8 of complete contact type due to the elasticity of the white reference member 22 itself. In this condition, the lower surface of the white reference member 22 is read by the image sensor 8 of complete contact type, thereby performing the pre-scan operation.

Figure 7:
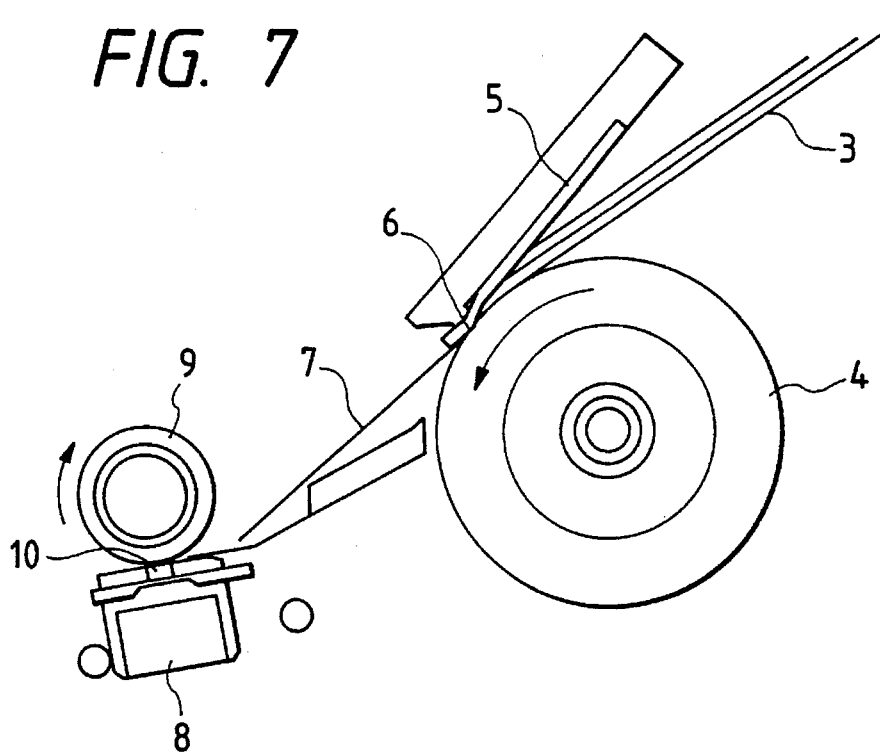
Figure 13A:
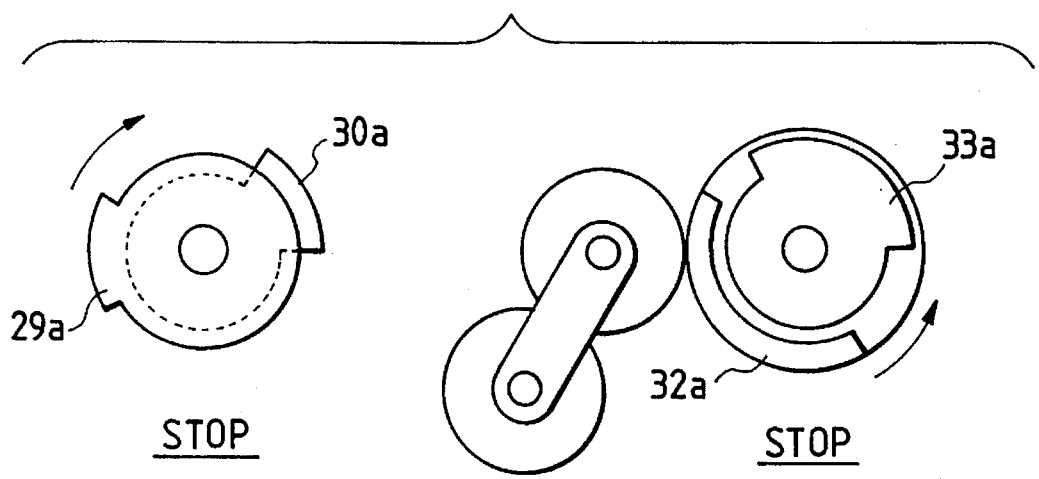
FIGS. 13A and 13B are schematic views of the drive mechanism in a condition of FIG. 6.
Figure 13B:
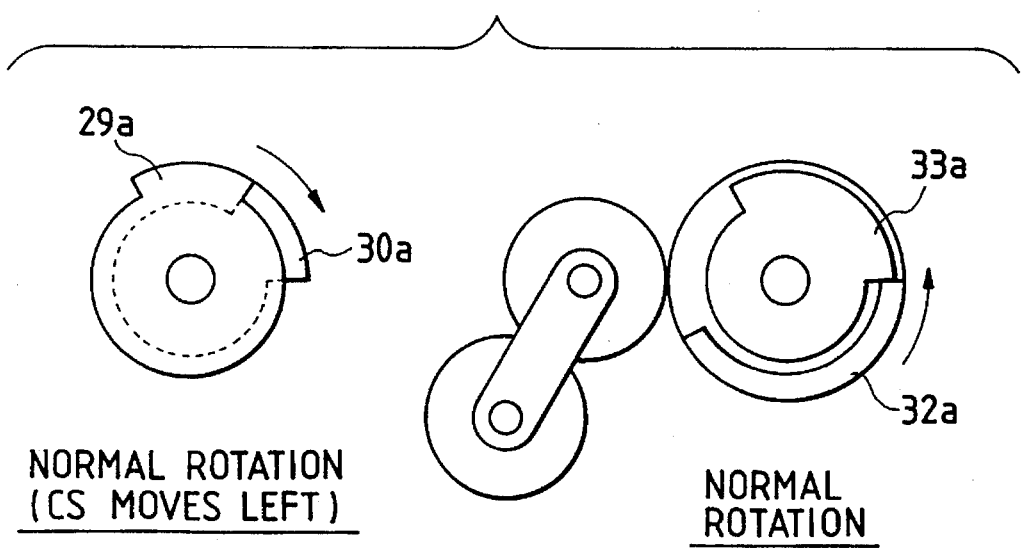

When the pre-scan operation is finished, the stepping motor is rotated in the normal direction. In this case, although the CS roller 9 is not rotated for a while because the mechanical timer mechanism is operated (FIG. 13A), when the projection 29a of the CS roller output gear 29 is abutted against the projection 30a of the CS roller output member 30, the CS roller 9 is rotated in the normal (FIG. 13B). By the normal rotation of the CS roller 9, the image sensor 8 of complete contact type is shifted to the left in FIG. 6. On the other hand, by the normal rotation A of the stepping motor, the original separation roller 4 is also rotated in the normal direction (FIG. 13B), thereby separating the original 7 from the original bundle 3 and conveying the separated original. When the stepping motor is rotated by a certain number of steps after the tip end of the original 7 was detected by the original tip end detection sensor $S_2$, the normal rotation of the stepping motor is stopped. When the normal rotation of the stepping motor is stopped, as shown in FIG. 7, the image information reading portion 10 of the image sensor 8 of complete contact type is contacted with the CS roller 9, but the tip end of the original 7 is not yet abutted against the CS roller 9. That is to say, in order to establish such a condition, the mechanical timer mechanism between the projection 29a of the CS roller output gear 29 and the projection 30a of the CS roller output member 30 and the mechanical timer mechanism between a projection 32a of the original separation roller output gear 32 and a projection 33a of the original separation roller output member 33 are adjusted.

Figure 14A:
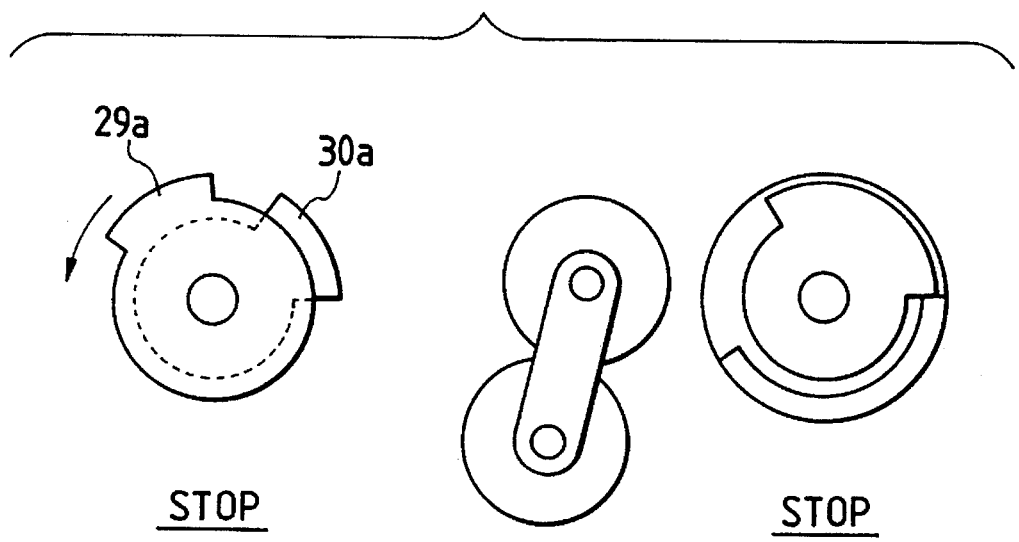
FIGS. 14A and 14B are schematic views of the drive mechanism in a condition of FIG. 7.
Figure 14B:
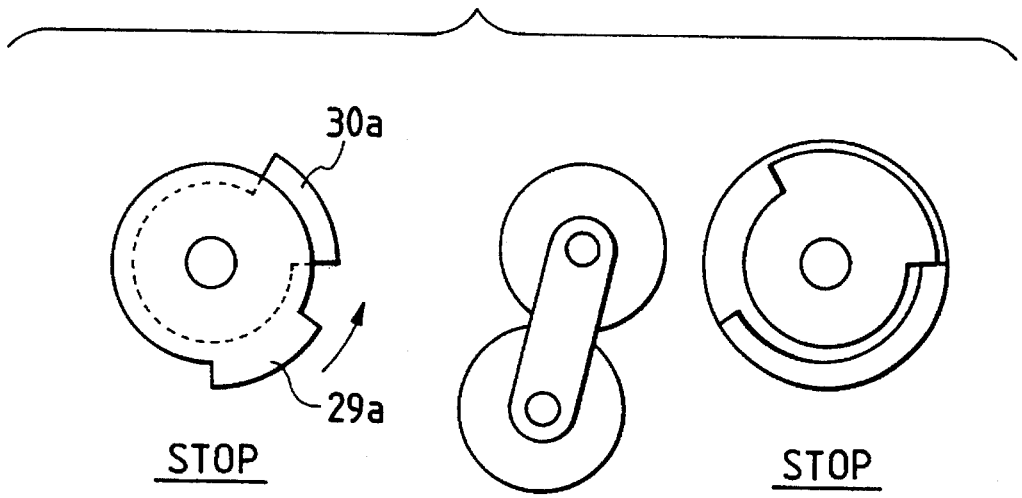

Then, the stepping motor is rotated in the reverse direction. In this case, the driving force is not transmitted to the original separation roller 4, and thus, the original separation roller is not rotated (FIG. 14A). Since the mechanical timer mechanism is operated, the CS roller 9 is not rotated (FIG. 14A). The reverse rotation of the stepping motor is stopped after the stepping motor is rotated by a certain number of steps. The mechanical timer mechanism between the projection 29a of the CS roller output gear 29 and the projection 30a of the CS roller output member 30 is adjusted so that the reverse rotation of the stepping motor is stopped before the projection 29a of the CS roller output gear 29 is abutted against the projection 30a of the CS roller output member 30 to start the rotation of the CS roller 9.

Figure 8:
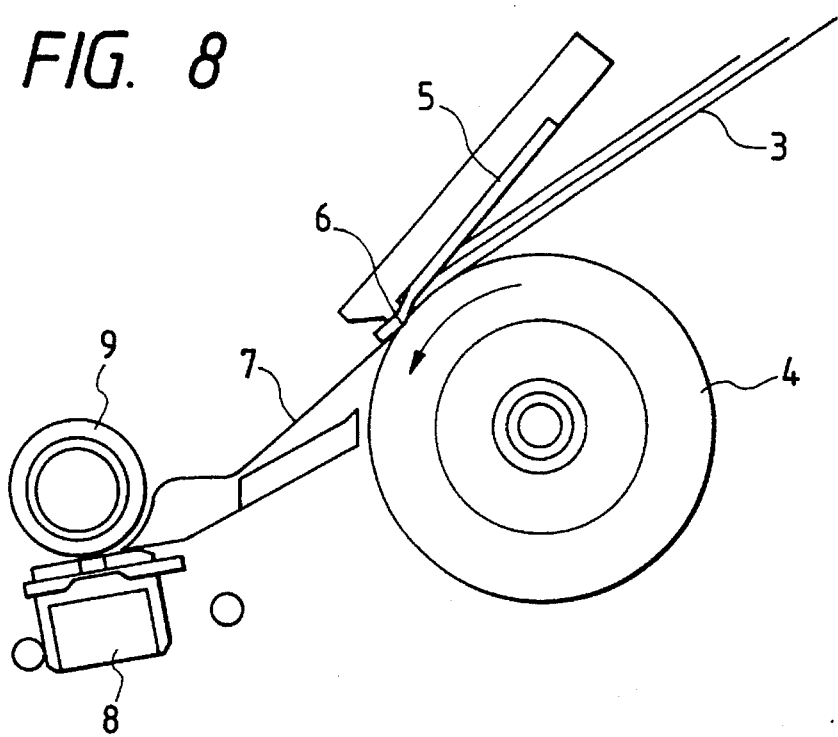
Figure 15A:
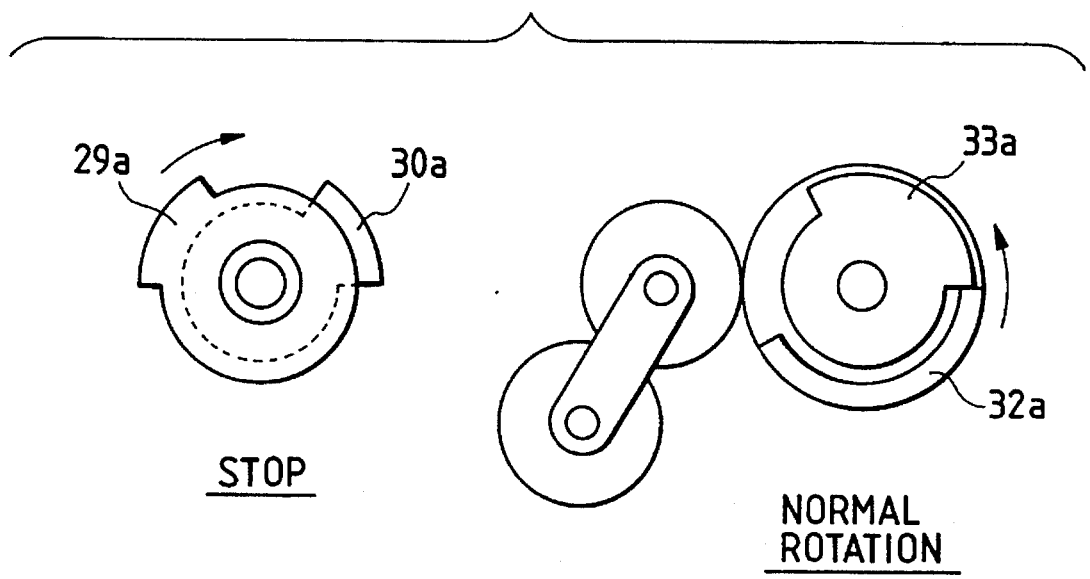
FIGS. 15A and 15B are schematic views of the drive mechanism in a condition of FIG. 8.

Then, the stepping roller is rotated in the normal direction A. By the normal rotation of the stepping motor, the original separation roller 4 is also rotated in the normal direction (FIG. 15A), thereby conveying the original 7. On the other hand, since the mechanical timer mechanism is operated, the CS roller 9 is not rotated for a while (FIG. 15A). Thus, as shown in FIG. 8, the tip end of the original 7 is abutted against the stopped CS roller 9. When the original separation roller 4 is further rotated, if resiliency of the original 7 is relatively small, as shown in FIG. 8, a loop is formed in the original 7 in the proximity of the CS roller 9. If the resiliency of the original is relatively great, a slip is caused between the original 7 and the original separation roller 4 at the original separation portion 6.

If the original is obliquely inserted, either the left front end or right front end (for example, left front end) of the original 7 is firstly abutted against the CS roller 9. Since the CS roller 9 is stopped, the left front end of the original cannot be further advanced. Further, since the original separation roller 4 is rotated in the normal direction, a front end portion of the original which is not yet abutted against the CS roller is advanced in the original conveying direction. As a result, the entire front end of the original is abutted against the stopped CS roller 9, thereby correcting the skew-insertion of the original. While the mechanical timer mechanism is being operated, the skew-insertion of all kinds of originals (including originals hard to be conveyed and originals apt to be conveyed) is corrected by the normal rotation of the original separation roller 4.

Figure 15B:
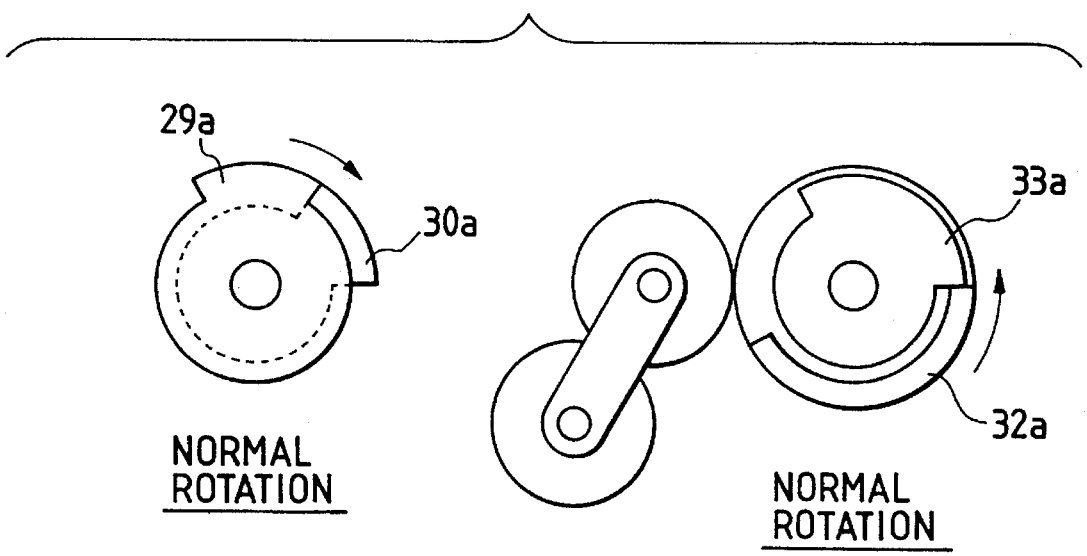

When the stepping motor is rotated by a certain number of steps to disenergize the mechanical timer mechanism and the projection 29a of the CS roller output gear 29 is abutted against the projection 30a of the CS roller output member 30, the CS roller 9 is rotated in the normal direction (FIG. 15B). Further, the stepping motor is rotated by a certain number of steps, thereby starting the reading of the image information. When the CS roller 9 is rotated in the normal direction, the original 7 starts to be pinched between the CS roller and the image sensor so that the heading of the original always becomes constant. Further, since the skew-insertion of the original is corrected, when the original is pinched between the CS roller and the image sensor, the conveying force of the CS roller is applied to the entire width of the original 7. Accordingly, the moment is not generated by the resistance force created by the friction force between the original separation piece 5 and the original 7, thereby preventing the skew-feed of the original 7.

Figure 9:
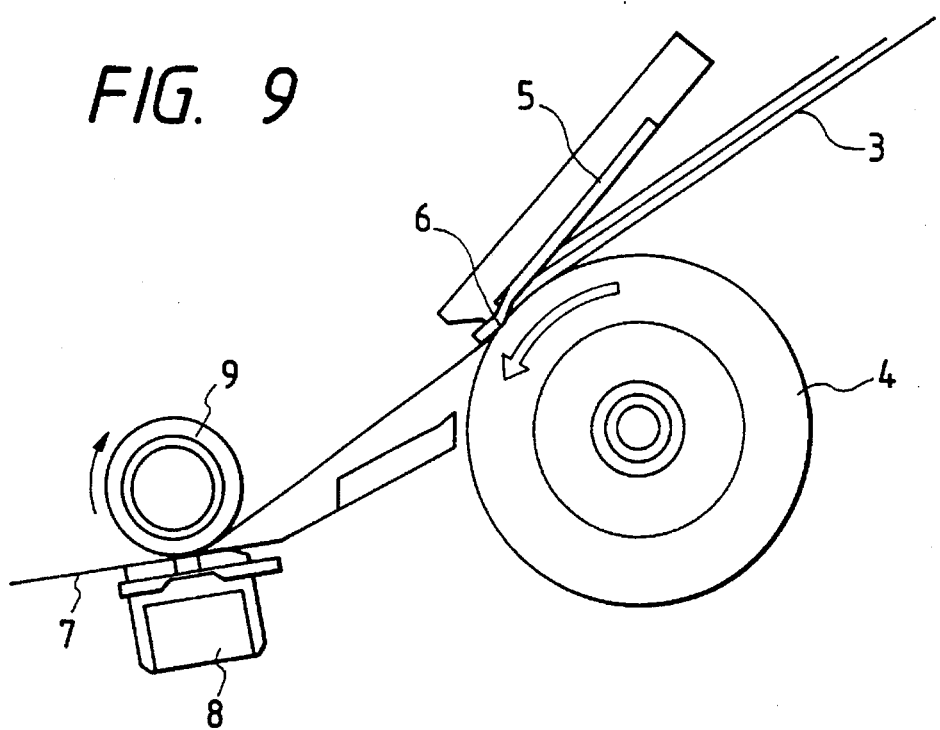
Figure 16:
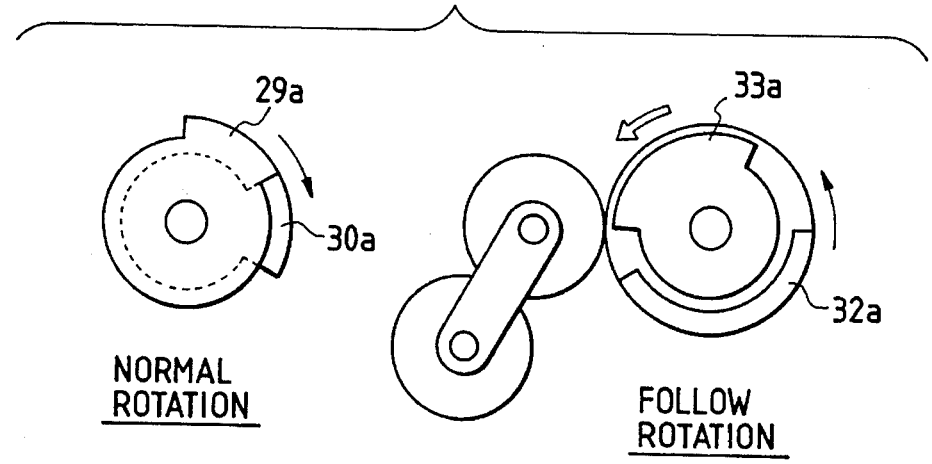
FIG. 16 is a schematic view of the drive mechanism in a condition of FIG. 9.

Thereafter, the stepping motor is further rotated in the normal direction to continue the rotations of the CS roller 9 and the original separation roller 4 for conveying the original (FIG. 16), during which the image information on the original 7 is read by the image information reading portion 10 of the image sensor 8 of complete contact type as shown in FIG. 9. The reading drive system is designed so that the original convey speed of the CS roller 9 becomes greater than the original convey speed of the original separation roller 4. Further, the biasing forces applied to the image sensor 8 of complete contact type and the original separation piece 5 are selected so that the original convey speed of the CS roller 9 becomes greater than an original drawing force of the original separation roller. Thus, it is designed so that the conveying speed of the original 7 is determined by the original conveying speed of the CS roller 9. Consequently, as shown in FIG. 9, when the original 7 is being conveyed by both of the original separation roller 4 and the CS roller 9, the original 7 is pulled by the CS roller 9 in the original conveying direction at the original separation portion 6. Thus, the original separation roller 4 is rotated faster than the shaft of the original separation roller to gradually separate the projection 32a of the original separation output gear 32 from the projection 33a of the original separation roller output member 33, with the result that the mechanical timer mechanism is operated (FIG. 16).

Figure 10:
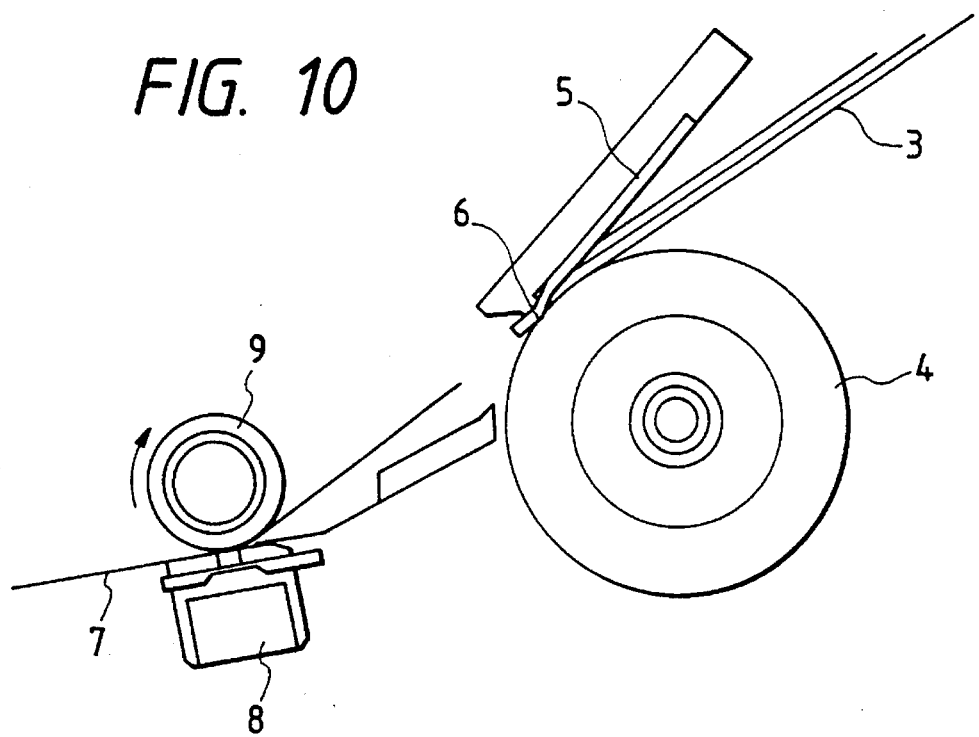
Figure 11:
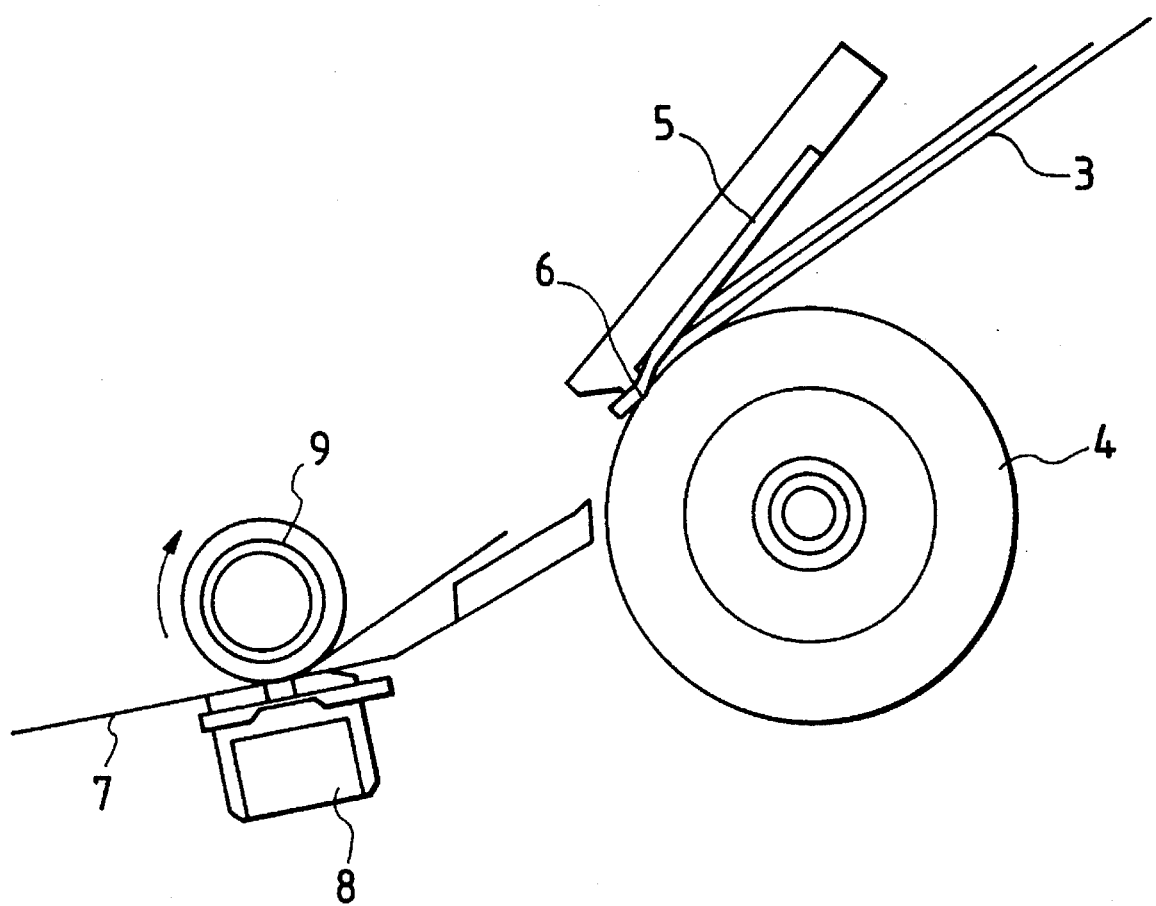
Figure 17A:
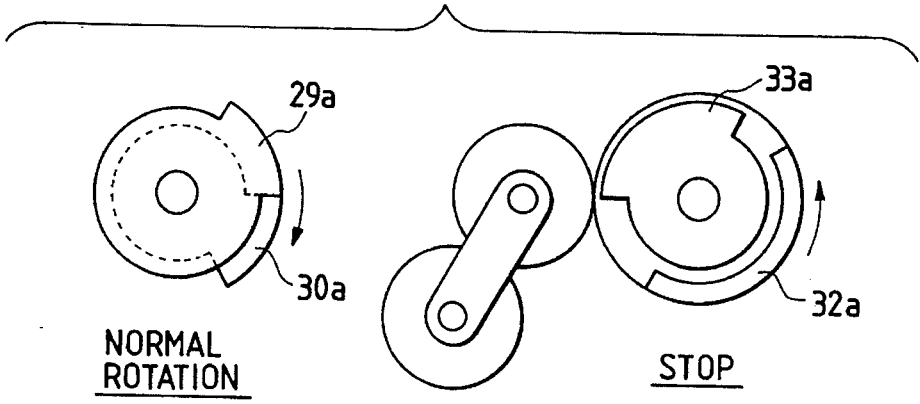
FIGS. 17A and 17B are schematic views of the drive mechanism in a condition of FIG. 10.
Figure 17B:
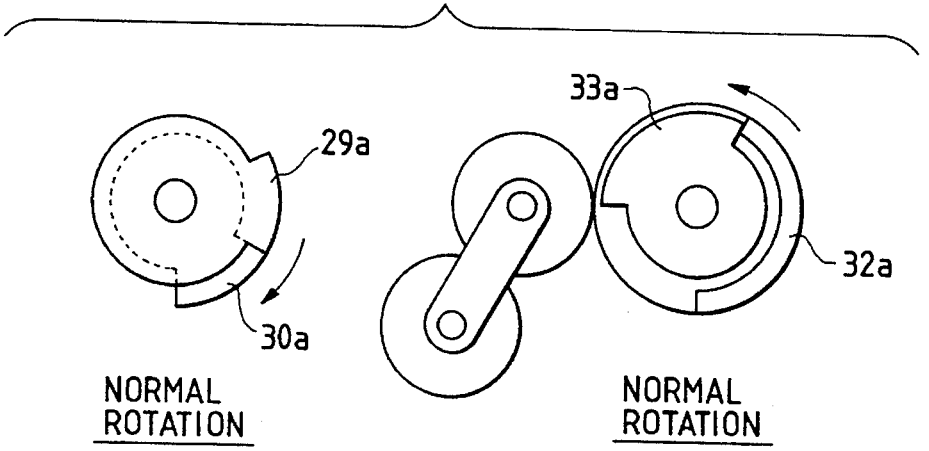

Further, when the stepping motor is further rotated and the trailing end of the original 7 passes through the original separation portion 6 as shown in FIG. 10, the pulling force of the CS roller 9 acting on the original separation portion 6 is ceased. In this case, since the mechanical timer mechanism is operated, although the original 7 is conveyed by the CS roller 9 for a while, the original separation roller 4 is not rotated (FIG. 17A). When the projection 32a of the original separation output gear 32 is abutted against the projection 33a of the original separation roller output member 33, the original separation roller 4 starts to be rotated again (FIG. 17B). In this case, the original 7 has already been conveyed by a certain amount. Thus, an adequate distance between the original 7 and a next original is reserved, and this distance is surely detected by the original end detection sensor $S_2$. Incidentally, in FIG. 10, after the trailing end of the original 7 is detected by the original end detection sensor, when the stepping motor is rotated by a predetermined number of steps, the reading of the image information is stopped. Then, the stepping motor is rotated in the normal direction to discharge the original (the image information of which was read) out of the apparatus.

The stepping motor is further rotated so that the next original is conveyed by the original separation roller 4. As shown in FIG. 7, the next original is stopped immediately before the CS roller, as is in the case of the first original 7. Thereafter, by repeating the operations shown in FIGS. 7 to 10, each original is separated from the original bundle 3 one by one, and the image information of the separated original is read.

After the absence of the original is detected by the original presence/absence detection sensor $S_1$ and the trailing end of the last original 7 is detected by the original end detection sensor $S_2$, when the stepping motor is rotated by a predetermined number of steps, the reading of the image information is stopped. The stepping motor is further rotated to discharge the last original 7 (the image information of which was read) out of the apparatus. Then, the stepping motor is stopped, so that the series of the image information reading operations are completed and the apparatus is in the waiting condition.

Figure 18:
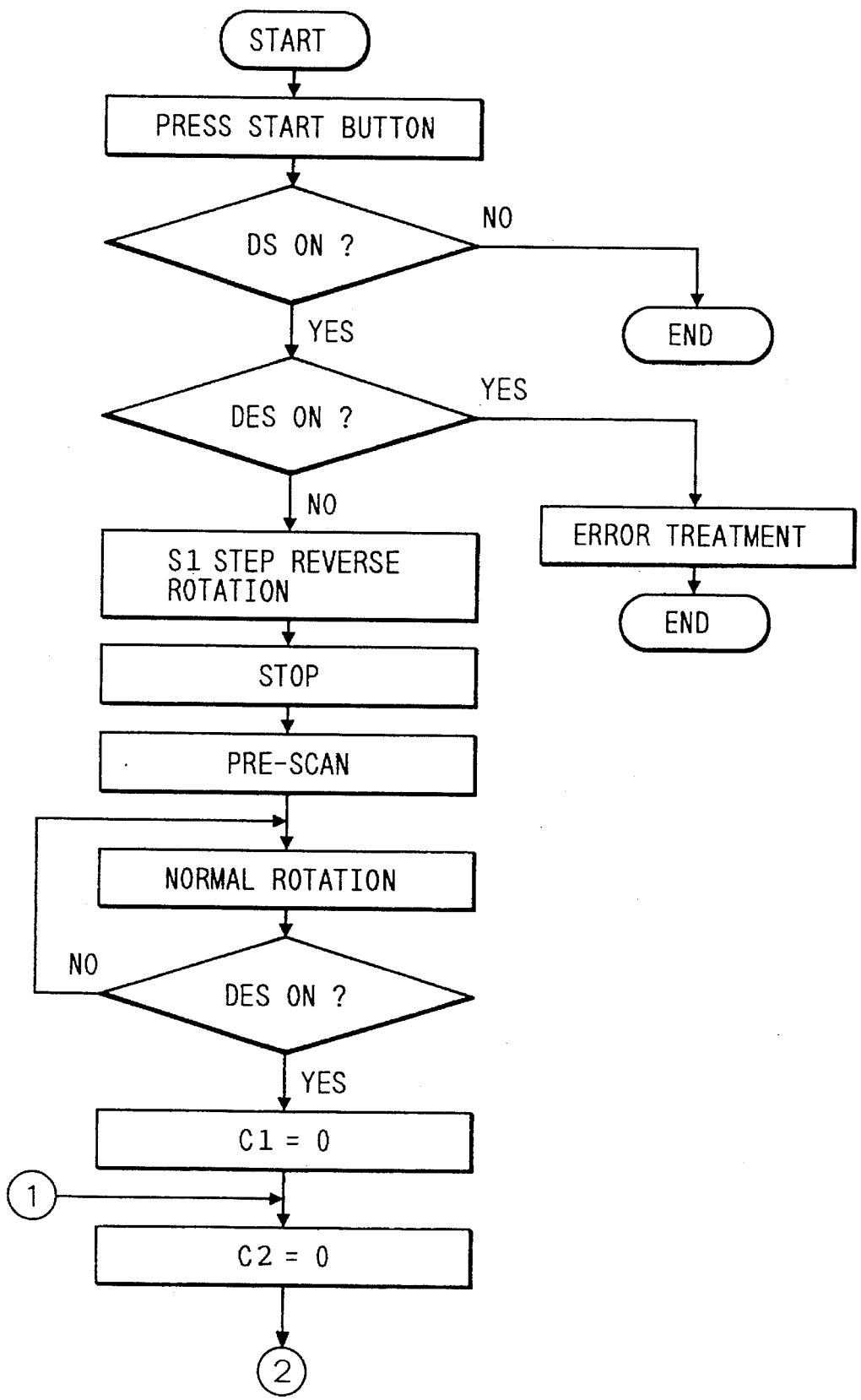
FIGS. 18 to 20 are flow charts for explaining the series of reading operations of the reading apparatus.
Figure 19:
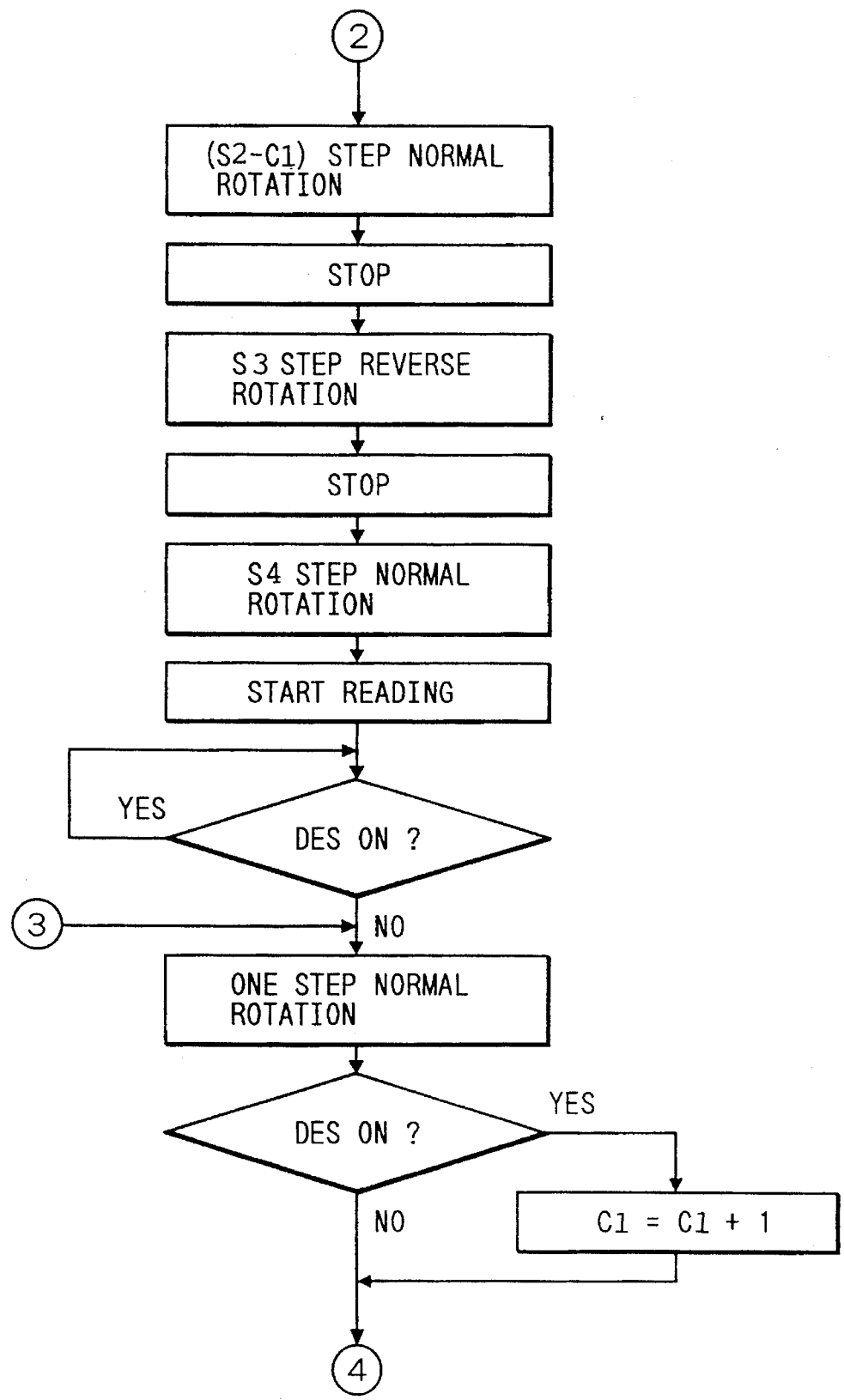
Figure 20:
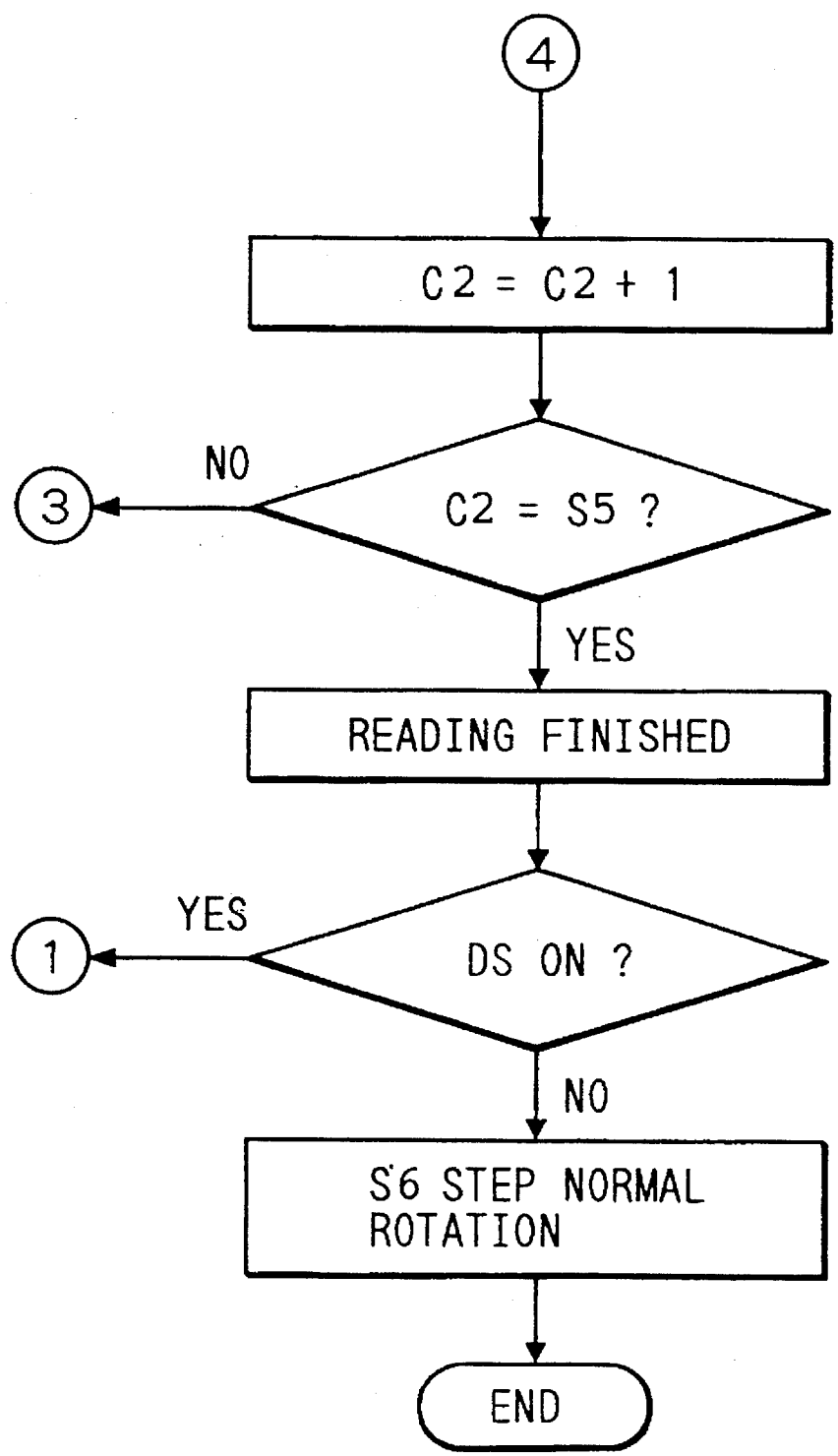

Flow charts for explaining the image information reading operations are shown in FIGS. 18 to 20.

First of all, when the start key is depressed, it is judged whether the original presence/absence sensor $S_1$, i.e. document sensor DS is turned ON or not. That is to say, it is judged whether the original exists in the original insertion path. If the document sensor DS is turned OFF, it is judged that there is no original in the original insertion path, and the image information reading operation is not started. On the other hand, if the document sensor DS is turned ON, it is judged whether the original end detection sensor $S_2$, i.e. a document edge sensor DES is turned ON or not. If the document edge sensor DES is turned ON, since there is a risk that the original is already pinched in the reading convey path and the image sensor of complete contact type cannot be shifted even when the CS roller is rotated in the reverse direction, error treatment is effected and the operation is stopped. On the other hand, if the document edge sensor DES is turned OFF, it is judged that the original is waiting in the correct position, and the stepping motor is rotated in the reverse direction by a predetermined number of steps (step S1). Then, the motor is stopped and the pre-scan is effected. Thereafter, the motor is rotated in the normal direction.

Then, it is judged whether the document edge sensor DES is turned ON or not to ascertain the position of the tip end of the original. If the document edge sensor DES is still turned OFF, the motor is further rotated. On the other hand, if the document edge sensor DES is turned ON, zero (0) is inputted to a counter 1, and zero is also inputted to a counter 2. Then, the motor is rotated in the normal direction by the number of steps corresponding to the number obtained by subtracting a step number inputted to the counter 1 from a certain step number (step S2). That is to say, in case of the first original, since the value of the counter 1 is zero, the motor is rotated in the normal direction by step S2. Thereafter, the motor is stopped and then is rotated in the reverse direction by a certain step number (step S3) and then is stopped again. Then, the reading of the image information is started.

Then, it is judged whether the document edge sensor DES is turned ON or not to ascertain the position of the trailing end of the original. If the document edge sensor DES is turned ON, the reading of the image information is continued. On the other hand, if the document edge sensor DES is turned OFF, the program goes to a next step. In this step, after the motor is rotated in the normal direction by one step, it is judged whether the document edge sensor DES is turned ON or not. If the document edge sensor DES is turned ON, the value of the counter 1 is increased by one (1). On the other hand, if the document edge sensor DES is turned OFF, the value of the counter 1 is kept as it is. Then, the value of the counter 2 is increased by one (1).

Then, it is judged whether the value inputted to the counter 2 is equal to a certain step number (step S5). If not equal, the program is returned to ③ in the flow chart, and then the motor is rotated again in the normal direction by one step. This sequence is repeated until the value inputted to the counter 2 becomes the same as the predetermined step number (step S5). Then, this routine is finished. In this case, the value inputted to the counter 2 equals to step S5 (That is to say, at this point, the step number after the document edge sensor DES is turned ON, i.e. step number after the second original passes through the document edge sensor DES is inputted to the counter 2). Then, the reading of the image information of the first original is finished.

Then, it is judged again whether the document edge sensor DES is turned ON or not. If the document edge sensor DES is turned OFF, it is judged that there is no next original, and the motor is rotated in the normal direction by a predetermined step number (step S6) to discharge the first original. Then, the program is finished. On the other hand, if the document edge sensor DES is turned ON, it is judged that there is a next original, and the program is returned to ① in the flow chart, where zero (0) is inputted to the counter 2. Then, the motor is rotated in the normal direction by a number of steps corresponding to the number obtained by subtracting a step number inputted to the counter 1 from the certain step number (step S2). Since the second original has already been advanced by the step number inputted to the counter 2 when the reading of the image information of the first original was finished, the number of steps advanced after the second original passes through the document edge sensor DES by rotating the stepping motor in the normal direction by (S2–C1) steps becomes S2 steps which are the same as the number of steps for the first original. The same operations are repeated regarding a third original, a fourth original and so on. When the reading of the image information of a last original is completed, the motor is rotated in the normal direction by a certain number of steps (step S6) to discharge the last original out of the apparatus.

Positioning of Reading Position of Image Sensor of Complete Contact Type

Figure 21:
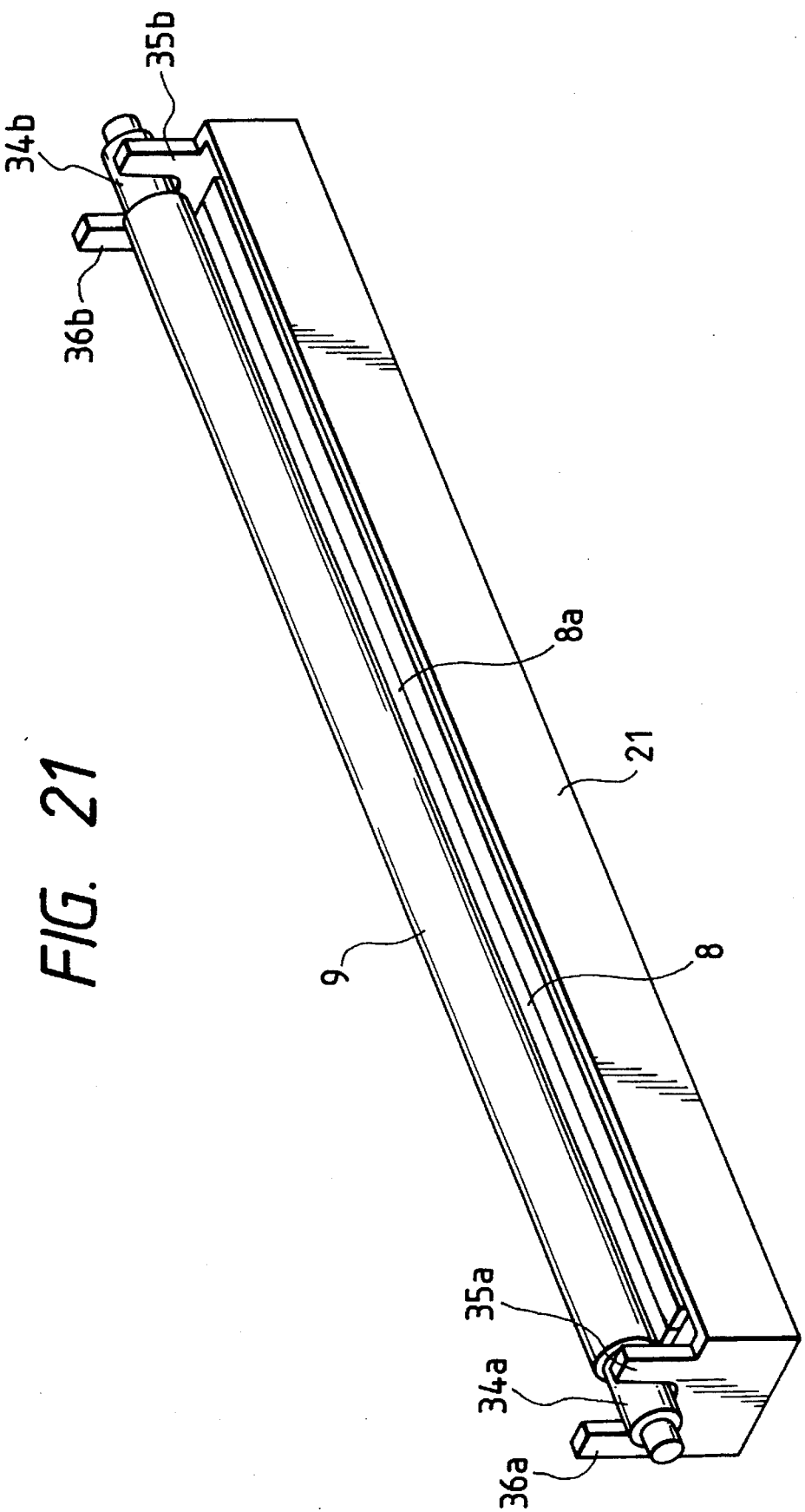
FIG. 21 is a perspective view of an image sensor of complete contact type of a reading apparatus according to an embodiment of the present invention.
Figure 22:
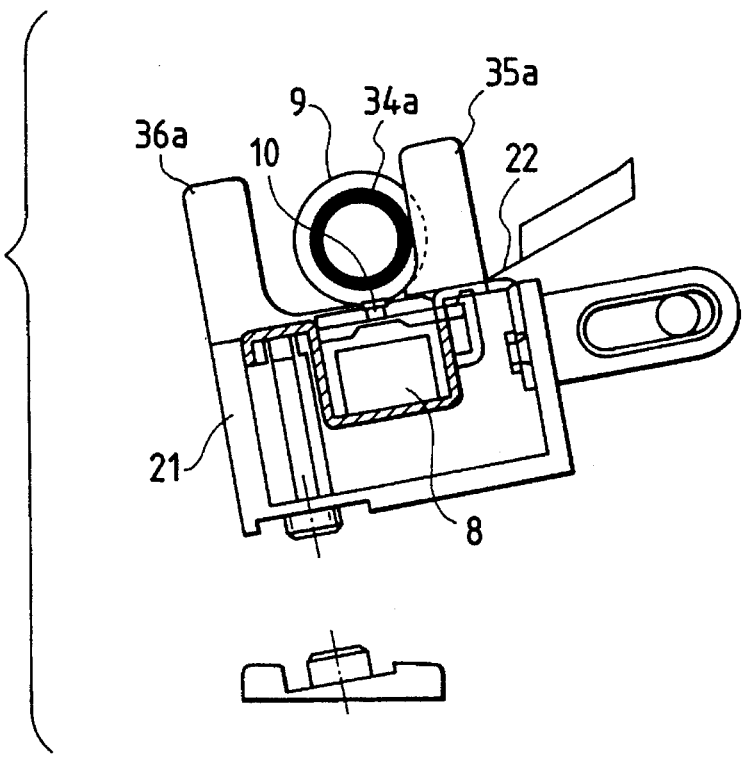
FIGS. 22 and 23 are schematic sectional views for explaining the positioning of a reading position of the image sensor of complete contact type of the reading apparatus.
Figure 23:
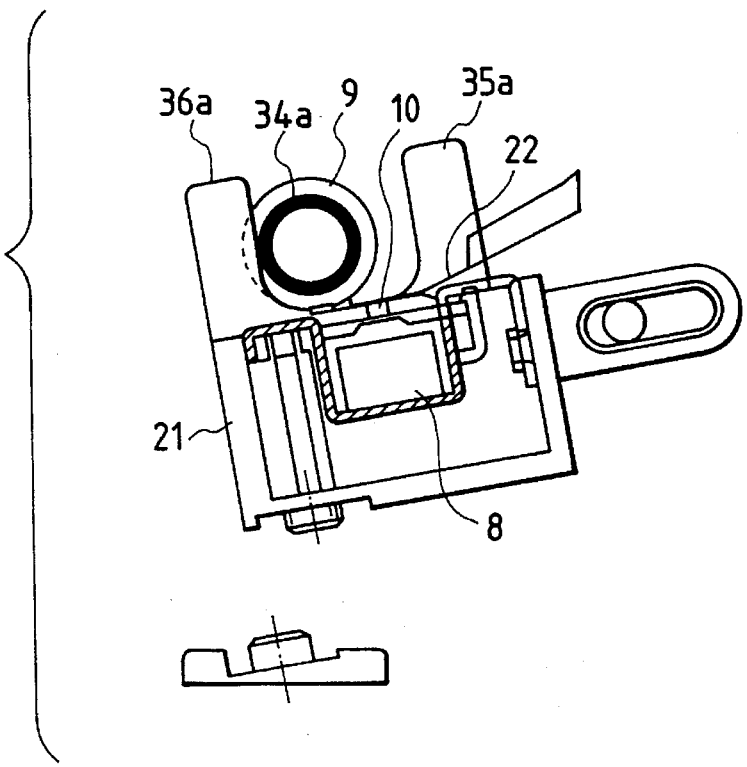
Figure 24:
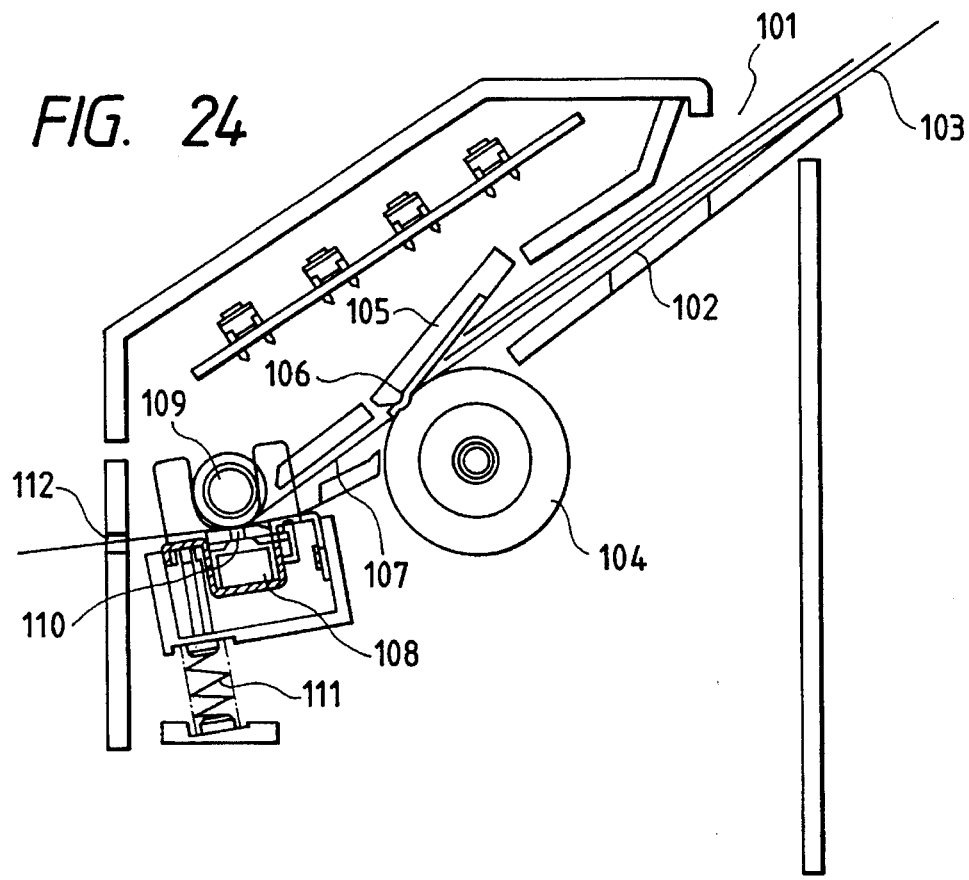
FIG. 24 is a schematic sectional view of a conventional original reading apparatus using an image sensor of complete contact type.
Figure 25:
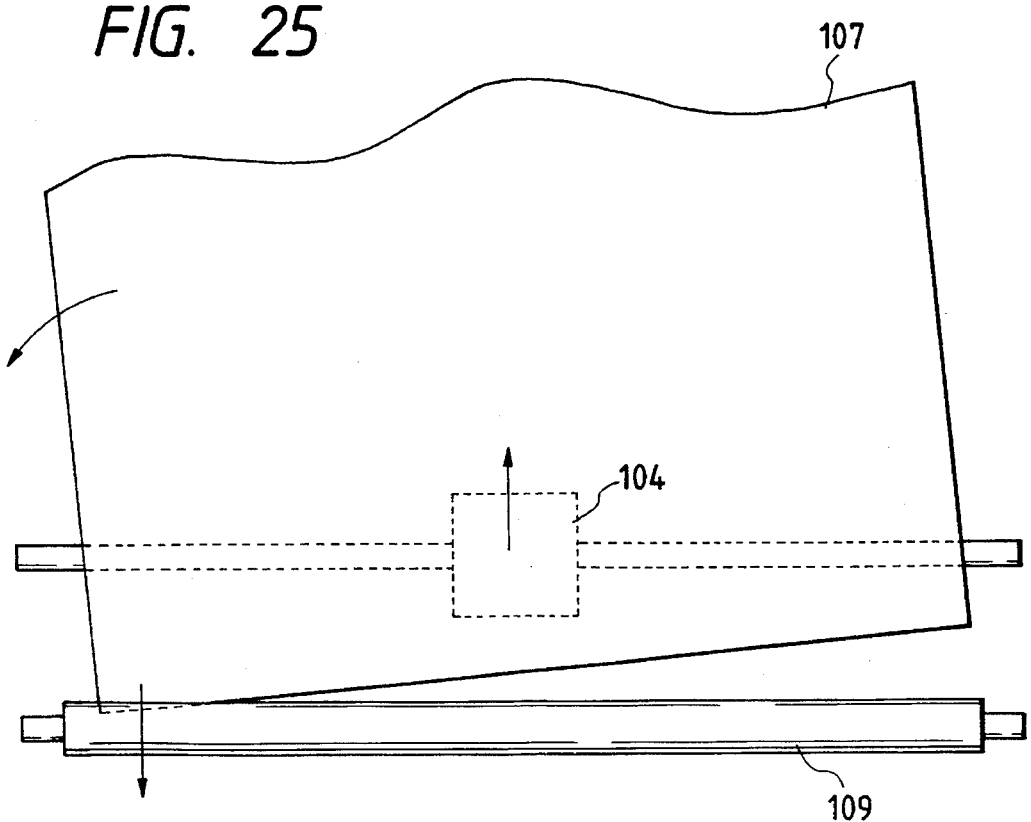
FIG. 25 is plan view for explaining a drawback if an original is inserted obliquely.

Another method for positioning the reading position of the image sensor of complete contact type of the reading apparatus is schematically shown in FIGS. 21 to 23. FIG. 21 is a schematic perspective view of the image sensor of complete contact type, CS roller and sensor holder, FIG. 22 is a view showing a relation between the image sensor 8 of complete contact type and the CS roller 9 in the image information reading condition, and FIG. 23 is a view showing a relation between the image sensor 8 of complete contact type and the CS roller 9 in the white reference reading condition.

In FIG. 21, cylindrical members or collars 34a, 34b each having an inner diameter substantially the same as an outer diameter of the shaft of the CS roller and capable of rotating with respect to the shaft of the CS roller with small friction are arranged on both longitudinal ends of the CS roller 9. The sensor holder 21 is provided at its both longitudinal ends with two pairs of projections 35a, 35b, 36a and 36b protruded vertically with respect to the reading glass surface 8a of the image sensor of complete contact type, and a distance between the projections 35a and 36a (35b and 36b) is greater than an outer diameter of the collar 34a (34b).

As shown in FIG. 22, in the image information reading condition, by abutting the left surface (in FIG. 22) of the (reading) projection 35a of the sensor holder 21 against the collar 34a, the sensor holder 21 and the CS roller 9 are positioned in the original conveying direction so that the image information reading portion 10 of the image sensor 8 mounted on the sensor holder 21 is contacted with the CS roller 9.

As shown in FIG. 23, in the white reference reading condition, by abutting the right surface (in FIG. 23) of the (pre-scan) projection 36a of the sensor holder 21 against the collar 34a, the sensor holder 21 and the CS roller 9 are positioned in the original conveying direction so that the image information reading portion 10 of the image sensor 8 mounted on the sensor holder 21 is contacted with the white reference member 22 secured to the apparatus. A relation between the collar 34b, reading projection 35b and pre-scan projection 36b shown in FIG. 21 is the same as the relation between the collar 34a, reading projection 35a and pre-scan projection 36a shown in FIGS. 22 and 23.

FIG. 22 also shows the relation between the image sensor 8 of complete contact type and the CS roller in the waiting condition, as well as the image information reading condition. When the image sensor 8 of complete contact type is shifted from the waiting position to the pre-scan position as shown in FIG. 23 by rotating the CS roller 9 in the reverse direction, the CS roller 9 is rotated in the reverse direction by the number of steps slightly greater than the number of steps required for shifting the image sensor 8 of complete contact type from the waiting position to the pre-scan position. In this way, by sliding the CS roller 9 on the image sensor 8 of complete contact type after the pre-scan projection 36a of the sensor holder 21 is abutted against the collar 34a, the image information reading portion 10 of the image sensor 8 of complete contact type can positively reach the white reference member 22 even if the image sensor 8 of complete contact type is not correctly shifted for any reason. Further, in the waiting condition, even if the position of the image sensor 8 of complete contact type is changed for any reason, by sliding the CS roller 9 on the image sensor 8 of complete contact type after the pre-scan projection 36a of the sensor holder 21 is abutted against the collar 34a, the positioning can easily be achieved.

Further, when the image sensor 8 of complete contact type is shifted from the pre-scan position shown in FIG. 23 to the image information reading position shown in FIG. 22, the CS roller 9 is rotated in the normal direction by the number of steps slightly greater than the number of steps required for shifting the image sensor 8 of complete contact type from the pre-scan position to the image information reading position so that the CS roller 9 is slid on the image sensor 8 of complete contact type after the reading projection 35a of the sensor holder 21 is abutted against the collar 34a. By doing so, even if the image sensor 8 of complete contact type is not correctly shifted for any reason, the image information reading portion 10 of the image sensor 8 of complete contact type can positively be contacted with the CS roller 9.

Incidentally, in the above-mentioned embodiment, while an example that the rockable gear train mechanism is used as the clutch mechanism for mechanically permitting or preventing the transmission of power on the basis of the rotational direction of the stepping motor was explained, the same advantage can be obtained by using another clutch mechanism such as a spring clutch, a needle clutch and the like. Furthermore, a convey roller may be arranged between the CS roller and the original separation roller. In this case, the convey roller may be turned ON/OFF similar to or independently from the original separation roller.

Incidentally, in the above-mentioned embodiment, while an example that the original convey roller and the white reference member are secured (stationary) and the image sensor 8 of complete contact type can be shifted was explained, the image sensor 8 of complete contact type may be secured and the original convey roller and the white reference member can be shifted. Also in this case, the same advantage can be achieved. Further, in this case, the original convey roller and the white reference member may be rotatingly shifted around a shaft of the original convey roller, or the original convey roller and the white reference member may be shifted in parallel. Of course, the original convey roller and the white reference member can be shifted and the image sensor of complete contact type can also be shifted.

Further, in the above-mentioned embodiment, while an example that the relative shifting movement of the image sensor of complete contact type is effected by the original convey roller was explained, the image sensor of complete contact type may be shifted by an additional drive means such as a motor or a solenoid. Also in this case, the same advantage can be achieved. Furthermore, while an example that the positioning is effected by using the projections and the collars or stoppers (51, 52) of the original convey roller was explained, the positioning is not limited to such an example. For example, the positioning may be performed by abutting either one end or the other end of the guide 21b against the pin 50.

In addition, the image sensor of complete contact type may normally be biased in the reading position or the pre-scan position by a biasing means such as a spring, an elastic body and the like, and, if necessary, the image sensor of complete contact type may be shifted in opposition to the biasing means. Further, in the above-mentioned embodiment, while the image sensor of complete contact type was used, an image sensor of another contact type, for example, using an equi-magnification optical system may be used. However, in consideration of the depth field, the image sensor of complete contact type is more preferable.

The support member 21a having the guide 21b may be integrally formed with the sensor holder 21, and the configuration of the guide 21b is not limited to the illustrated one. For example, any guide for guiding an outer surface of the support member 21a may be used. The original convey roller may be made of any material so long as the original is correctly conveyed by the original convey roller. Further, the width of the roller is not necessarily greater than the maximum original reading width, but may be divided into a plurality of width sections.

In addition, since the original convey roller does not necessarily act as the white reference, any roller having a desired color can be used. In this case, if a black roller is used, when the original convey roller is in the reading position, such a roller can be used as a black reference. However, in consideration of the fact that an image on an original having highly transparent background such as a thin original can be read, it is desirable to use a roller having brighter color or light achromatic color. In this regard, the white roller is preferable.

Incidentally, the present invention is not limited to the above-mentioned embodiment, but, various alterations and modifications can be made within the scope of the present invention.

What is claimed is:

1. An original reading apparatus including a reading means comprising:

a first rotary member for conveying an original;

an image information reading portion disposed downstream of said first rotary member; and a second rotary member, disposed downstream of said first rotary member and opposed to said image information reading portion, for conveying the original, said apparatus being operative to perform:

a pre-scan mode for reading a color reference member by said reading portion before the original is read by said reading portion, the pre-scan mode being effected such that said reading portion is caused to be opposed to the color reference member by relatively shifting said reading means and the color reference member, a registration operation for aligning a tip end of the original before the original is read, and a reading mode for reading the original by said reading means and conveying the original, wherein the pre-scan mode is effected by rotating said second rotary member is a reverse direction, the registration mode is effected by stopping said second rotary member and by rotating said first rotary member in a normal direction, and the reading mode is effected by rotating said second rotary member in a normal direction.

2. An original reading apparatus according to claim 1, wherein the normal rotation, reverse rotation and stoppage of said first and second rotary members are effected by controlling normal and reverse rotations of a single motor and a delay mechanism for transmitting the rotation of said motor with a time lag.

3. An original reading apparatus according to claim 1 or 2, wherein said image information reading portion and said color reference member are relatively shifted by rotating said second rotary member in the reverse direction to face said image information reading portion and said color reference member to each other.

4. An original reading apparatus according to claim 3, wherein said image information reading portion is shifted towards said color reference member by a friction force generated by the reverse rotation of said second rotary member and is returned to a position where said image information reading portion faces said secondary rotary member by a friction force generated by the normal rotation of said second rotary member.

5. A reading apparatus according to claim 1, wherein said pre-scan, registration and reading operations are effected by normal and reverse rotations of a single motor and an output gear train.

6. A reading apparatus according to claim 5, wherein said first rotary member comprises an original separation roller for separating the original from an original bundle one by one and said second rotary member comprises a contact sensor roller for urging the original against said image information reading portion, and further comprising a mechanical timer mechanism disposed between said contact sensor roller and a contact sensor roller output gear and between said original separation roller and an original separation roller output gear, respectively, and a clutch mechanism disposed between the single motor as a drive source and said original separation roller output gear for mechanically permitting or preventing the transmission of power to said original separation roller output gear on the basis of a rotational direction of the single motor.

7. A reading apparatus according to claim 5; wherein each of said mechanical timer mechanisms comprises a roller output member mounted on a roller shaft and integrally formed with a respective roller, and a roller output gear rotatably mounted on said roller shaft, wherein said roller output member has a projection protruded toward a circumferential direction of said roller and said roller output gear has a projection protruded toward an axial direction of said roller so that, when said roller output gear is rotated, if said projection of said roller output gear is separated from said projection of said roller output member, a driving force of said roller output gear is not transmitted to said roller output member to keep said roller stationary, whereas, if said projection of said roller output gear is contacted with said projection of said roller output member, the driving force of said roller output gear is transmitted to said roller output member to rotate said roller.

8. A reading apparatus according to claim 6, wherein said clutch mechanism for mechanically permitting or preventing the transmission of power to said original separation roller output gear on the basis of the rotational direction of the single motor comprises a rockable gear train mechanism.

9. A reading apparatus according to claim 8, wherein said rockable gear train mechanism comprises a sun gear, and a planetary gear rotatably mounted on a stud and always meshed with said sun gear, wherein said planetary gear is connected to said sun gear via a bracket so that, when said sun gear is roatated, said planetary gear and said bracket are rotated around said sun gear.

10. An information processing apparatus comprising:

a reading apparatus according to claim 1; and transmitting means for transmitting read information.

11. An information processing apparatus according to claim 10, further comprising a recording means.

12. An information processing apparatus according to claim 11, wherein said recording means comprises an ink jet recording head.

13. An information processing apparatus according to claim 12, wherein said ink jet recording head discharges ink by utilizing thermal energy.

14. An information processing apparatus according to claim 10, wherein a relative shifting is effected by a normal rotation or a reverse rotation of a motor acting as a drive source.

15. An original reading apparatus comprising:

a first rotary member for conveying an original;

a conveying member for feeding the original;

an image reading portion disposed downstream from said first rotary member;

a second rotary member, opposed to the image reading portion, for conveying the original; and a motor, said apparatus being operative to perform:

a pre-scan mode for reading a color reference member by said reading portion before a reading of the original is effected by said reading portion or a conveying of the original has been performed, the pre-scan mode being effected such that said image reading portion is caused to oppose the color reference member by rotating the motor in a first direction, and reading of the original is effected by a feeding of the original by said conveying member and by rotating said motor in a second direction, and a registration mode for aligning a tip end of the original before reading is effected, the registration mode being effected by applying a conveying force to the original while restraining a feeding of the tip end of the original by rotating said motor in the second direction.

16. An original reading apparatus according to claim 15, further comprising a transmission means for transmitting rotation of said motor to said first and second rotary members, wherein said transmission means rotates said second rotary member in a reverse direction by using the rotation of said motor in the first direction and rotates said second rotary member in a normal direction by using the rotation of said motor in the second direction.

17. An original reading apparatus according to claim 15, further comprising a delay mechanism for rotating said first rotary member in a normal direction and for temporarily stopping said second rotary member when said motor is rotated in the second direction.

* * * * *

UNITED STATES PATENT AND TRADEMARK OFFICE
CERTIFICATE OF CORRECTION

PATENT NO. : 5,579,129

DATED : November 26, 1996

INVENTOR(S): NAOHIRO IWATA ET AL.

It is certified that error appears in the above-identified patent and that said Letters Patent is hereby corrected as shown below:

COLUMN 4

Line 31, "is" should read --is a--.

COLUMN 7

Line 55, "mode" should read --modes--.

COLUMN 16

Line 59, "5;" should read --6,--.

COLUMN 17

Line 19, "roatated," should read --rotated--.
    Line 38, "a conveying member for feeding the original;" should be deleted.

UNITED STATES PATENT AND TRADEMARK OFFICE
CERTIFICATE OF CORRECTION

PATENT NO. : 5,579,129

DATED : November 26, 1996

INVENTOR(S) : NAOHIRO IWATA ET AL.

It is certified that error appears in the above-identified patent and that said Letters Patent is hereby corrected as shown below:

<u>COLUMN 18</u>

Line 10, "portion or a" should read --portion,--.
    Line 11, "conveying of the original has been performed;" should be deleted.
    Line 16, "feeding" should read --conveying--, and "conveying" should read --second rotary--.
    Line 21, "original" should read --original by said first rotary member--, and "feeding" should read --conveying--.
    Line 22, "original" should read --original by said second rotary member,--.

Signed and Sealed this

Ninth Day of September, 1997

*Attest:*

BRUCE LEHMAN

*Attesting Officer*     *Commissioner of Patents and Trademarks*